US012560476B2

(12) United States Patent
Gurindagunta et al.

(10) Patent No.: US 12,560,476 B2
(45) Date of Patent: Feb. 24, 2026

(54) LEVEL-BASED FAULT DETECTION FOR A ROW DRIVER OF AN OPTICAL SENSOR

(71) Applicant: SEMICONDUCTOR COMPONENTS INDUSTRIES, LLC, Scottsdale, AZ (US)

(72) Inventors: Sundaraiah Gurindagunta, Gollapudi (IN); Revathi Kuruba, Hyderabad (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 255 days.

(21) Appl. No.: 18/400,359

(22) Filed: Dec. 29, 2023

(65) Prior Publication Data

US 2025/0216252 A1      Jul. 3, 2025

(51) Int. Cl.
*G01J 1/44* (2006.01)
*H04N 17/00* (2006.01)
(52) U.S. Cl.
CPC .............. *G01J 1/44* (2013.01); *H04N 17/002* (2013.01)
(58) Field of Classification Search
CPC ......... G01J 1/44; H04N 17/002; G01R 31/00; H04B 17/00
See application file for complete search history.

(56) References Cited

U.S. PATENT DOCUMENTS 12,401,781  B2 *   8/2025  Wang .................. H04N 17/002
2021/0092353  A1    3/2021  Oberoi et al.

FOREIGN PATENT DOCUMENTS

DE       60033753 T2     4/2007
DE      102020005864 A1  3/2021

OTHER PUBLICATIONS

Yu, Byung-Chang, et al., Automatic Fault Detection Circuit for Integrated Gate Drivers of Active-Matrix Displays, IEEE Journal of the Electron Devices Society, vol. 7, 2019, pp. 315-321.

* cited by examiner

*Primary Examiner* — Georgia Y Epps
*Assistant Examiner* — Don J Williams
(74) *Attorney, Agent, or Firm* — Brake Hughes Bellermann LLP

(57)                   ABSTRACT

An illustrative fault detection system may include an input node, a transport circuit, and a comparison circuit. The input node may electrically connect to a row driver that produces, on the input node, a row driver voltage having one of a plurality of analog voltage levels. The transport circuit may be configured to transport, when the row driver is selected from a plurality of row drivers, the row driver voltage to a monitoring node shared by a plurality of fault detection systems including the fault detection system. The comparison circuit may be shared by the plurality of fault detection systems and may be configured to generate a digital output by conditioning a voltage from the monitoring node, performing a comparison between the conditioned voltage and a reference voltage, and latching the digital output based on the comparison. Corresponding systems, integrated circuits, and methods are also disclosed.

20 Claims, 11 Drawing Sheets

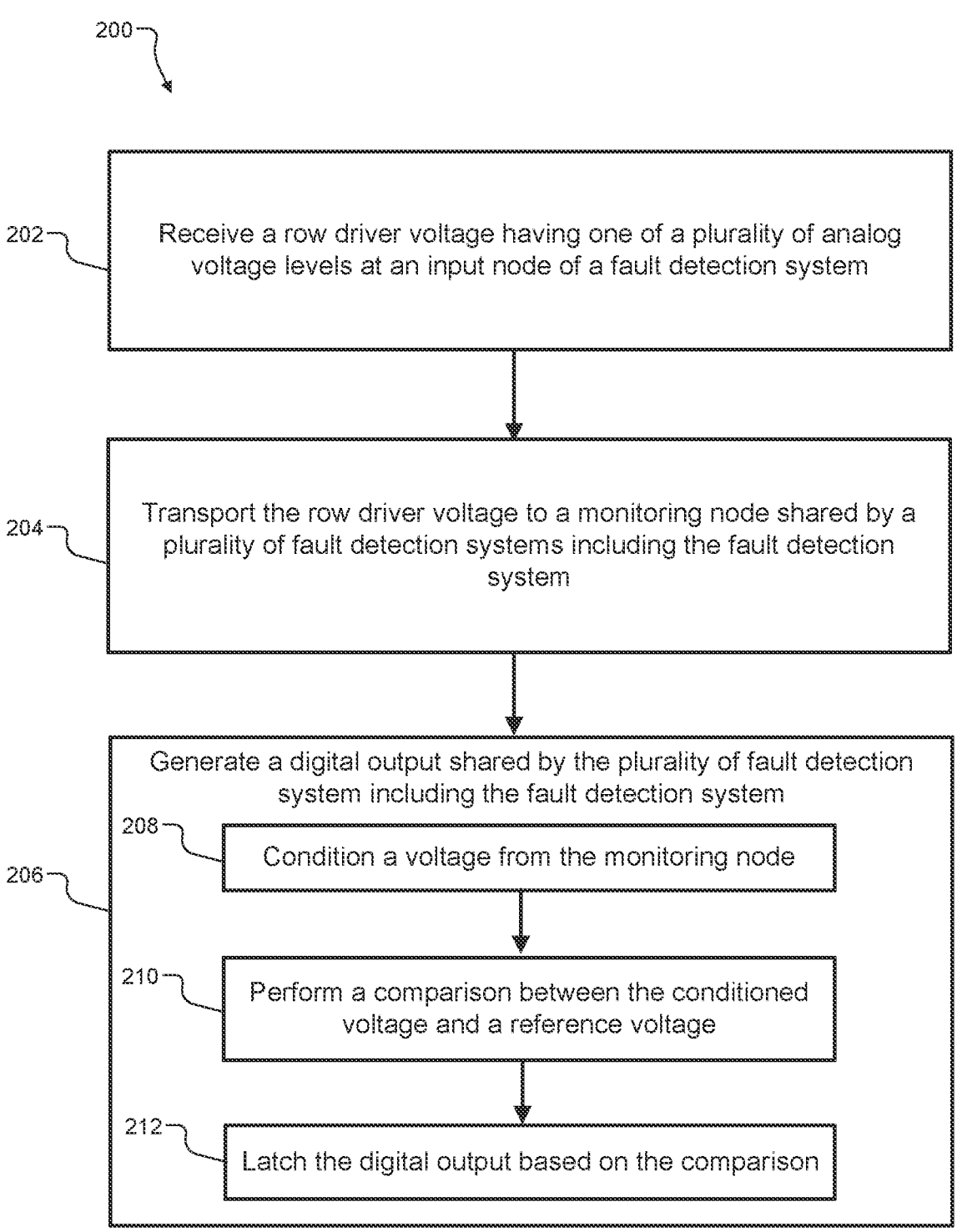

200

202 Receive a row driver voltage having one of a plurality of analog voltage levels at an input node of a fault detection system 204 Transport the row driver voltage to a monitoring node shared by a plurality of fault detection systems including the fault detection system 206 Generate a digital output shared by the plurality of fault detection system including the fault detection system 208 Condition a voltage from the monitoring node 210 Perform a comparison between the conditioned voltage and a reference voltage 212 Latch the digital output based on the comparison

FIG. 2

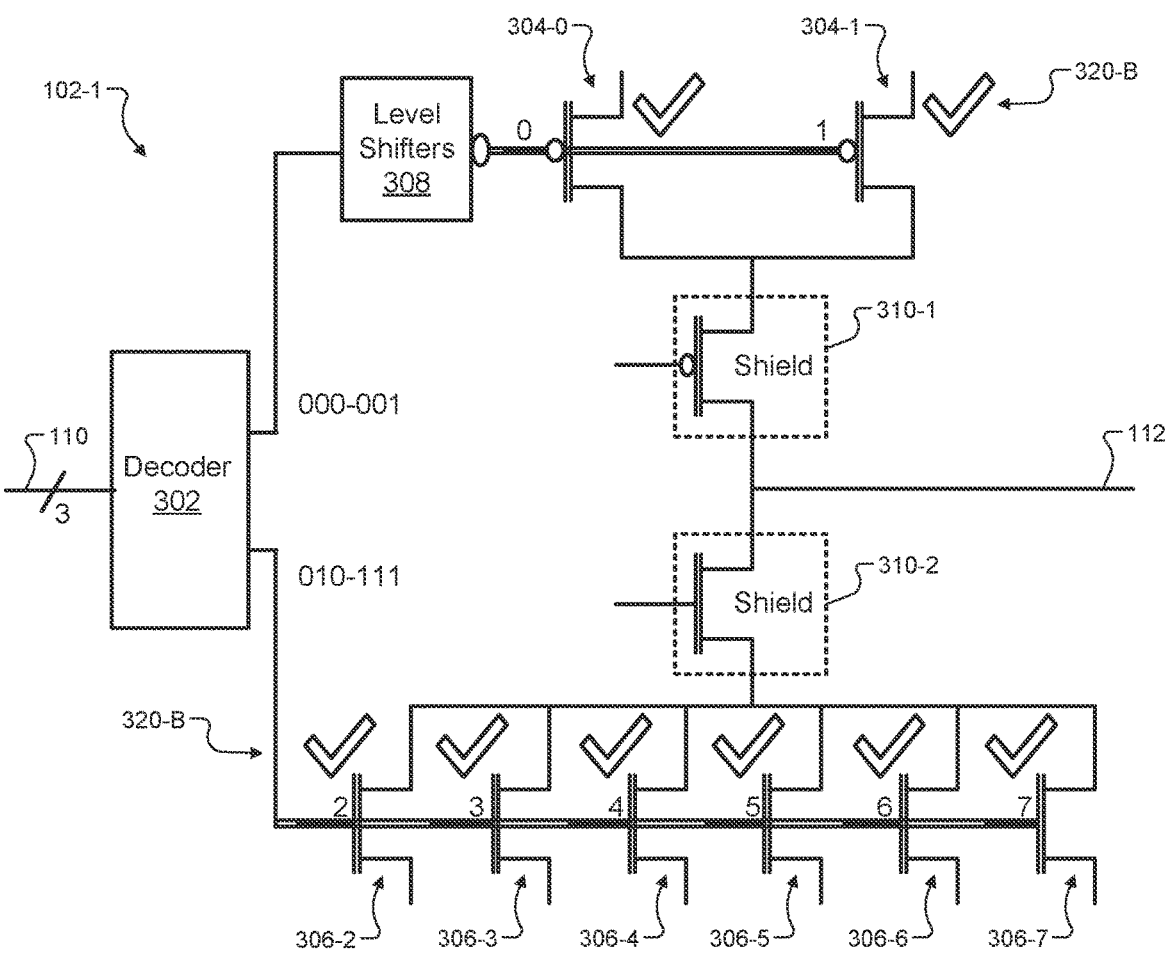
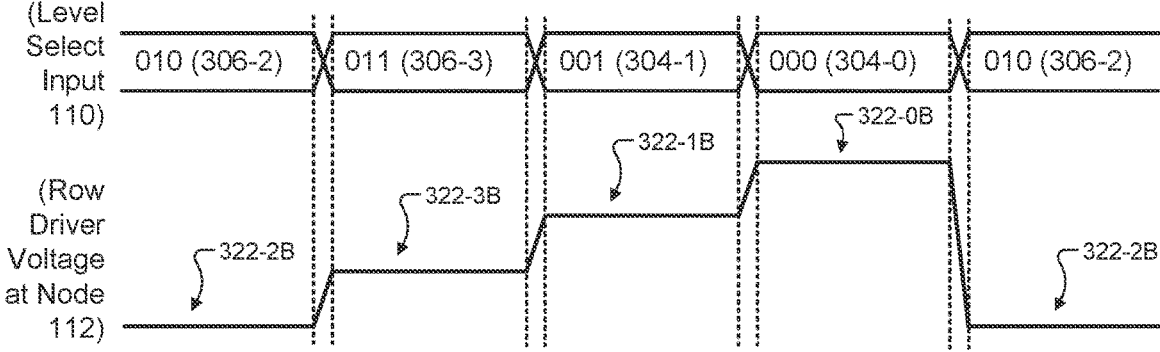
FIG. 3B

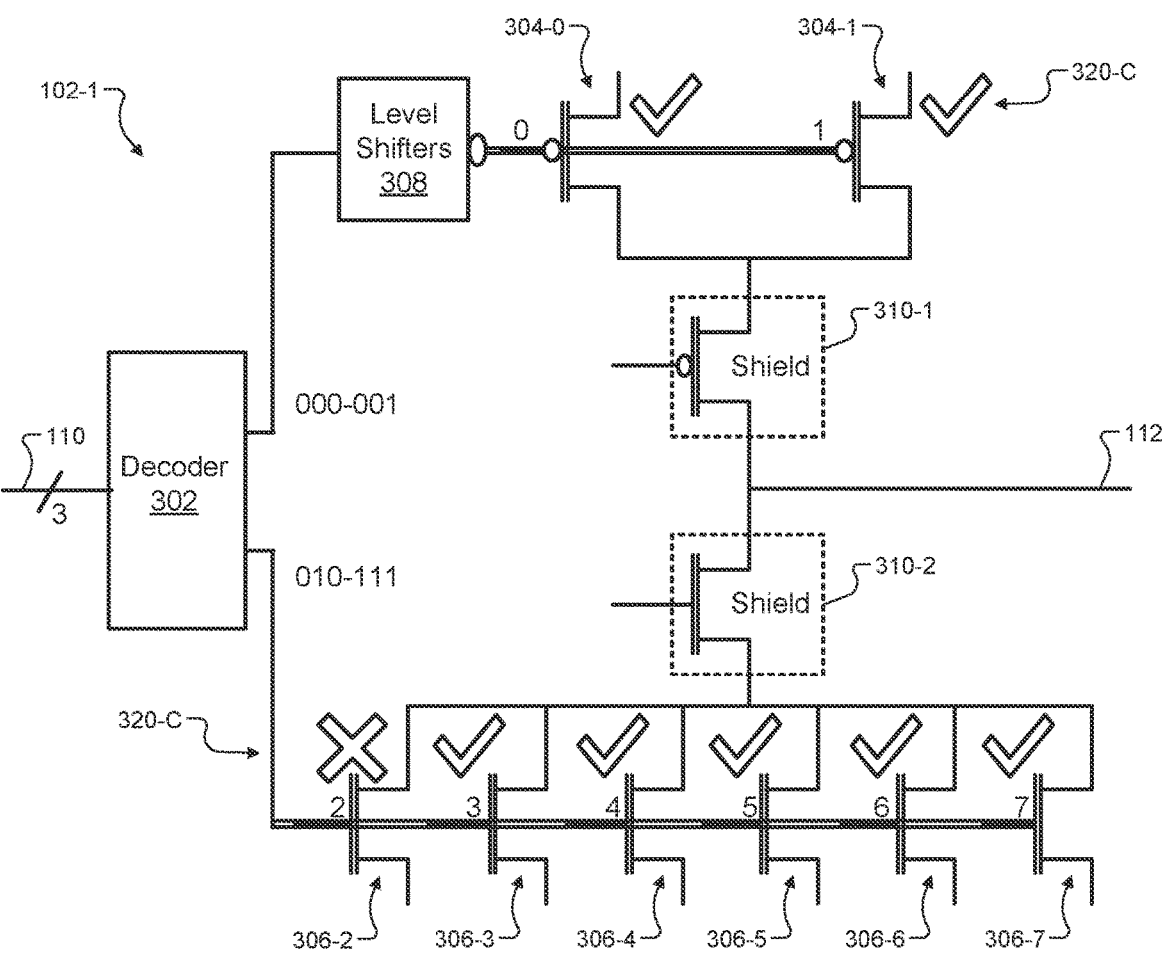
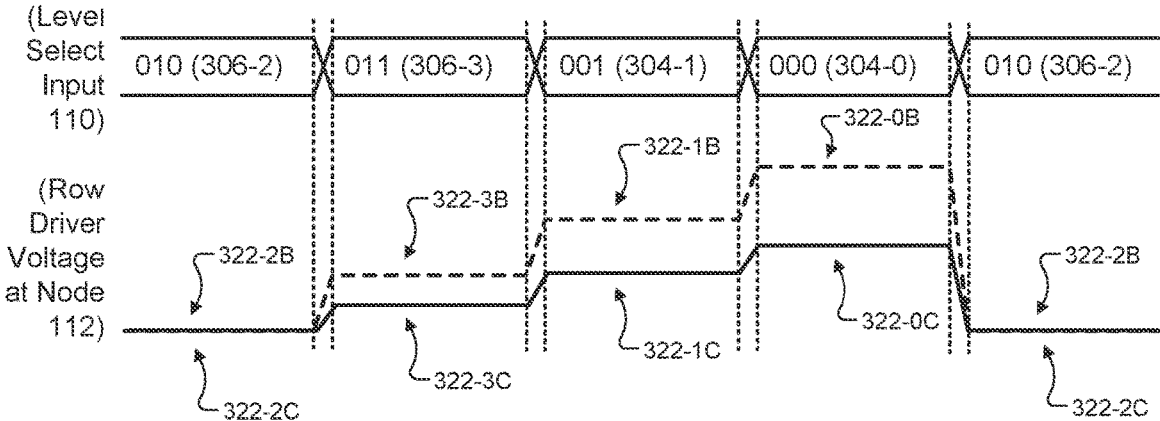
FIG. 3C

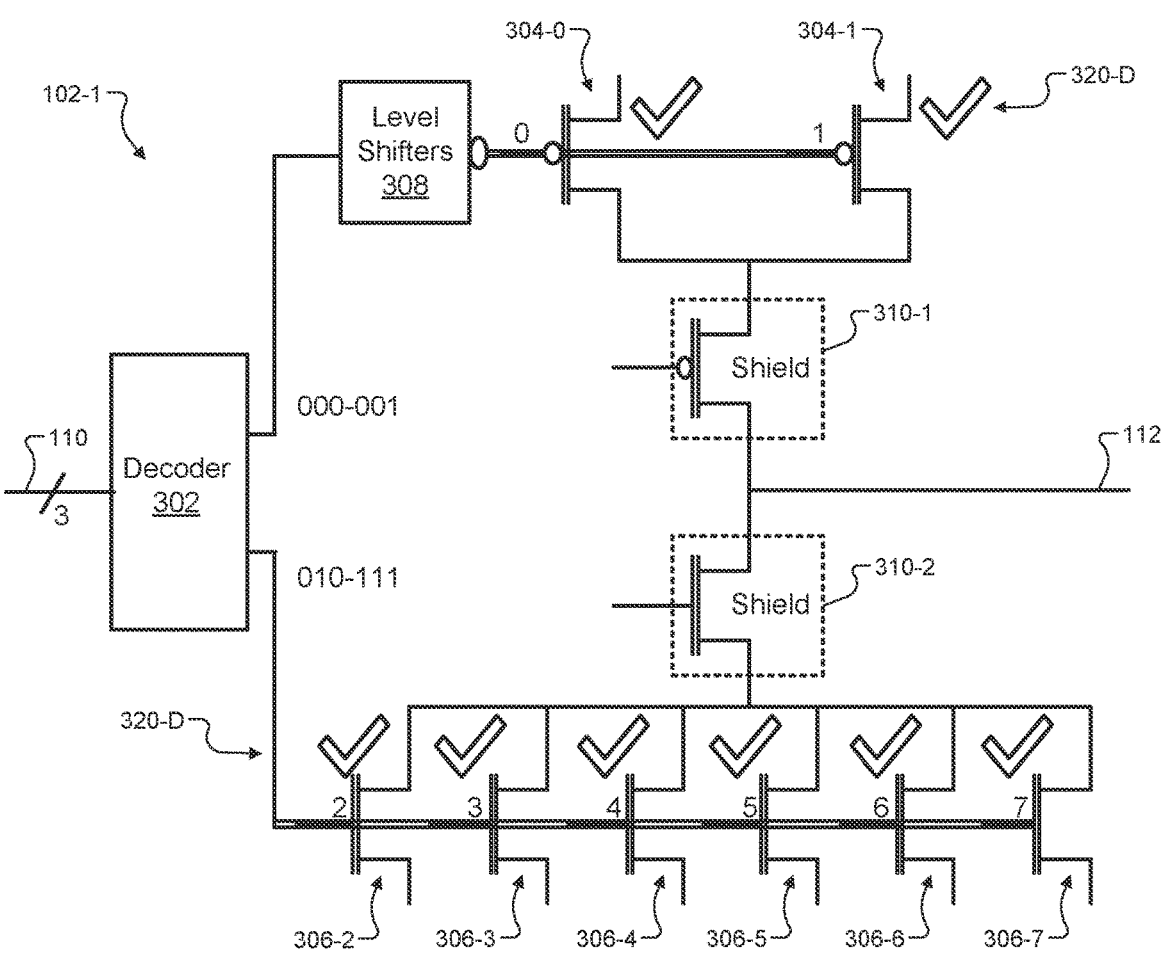
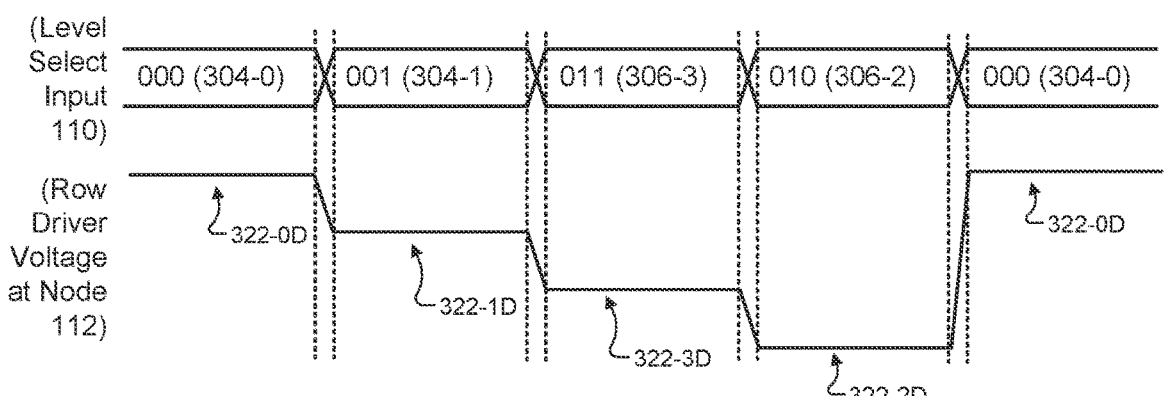
FIG. 3D

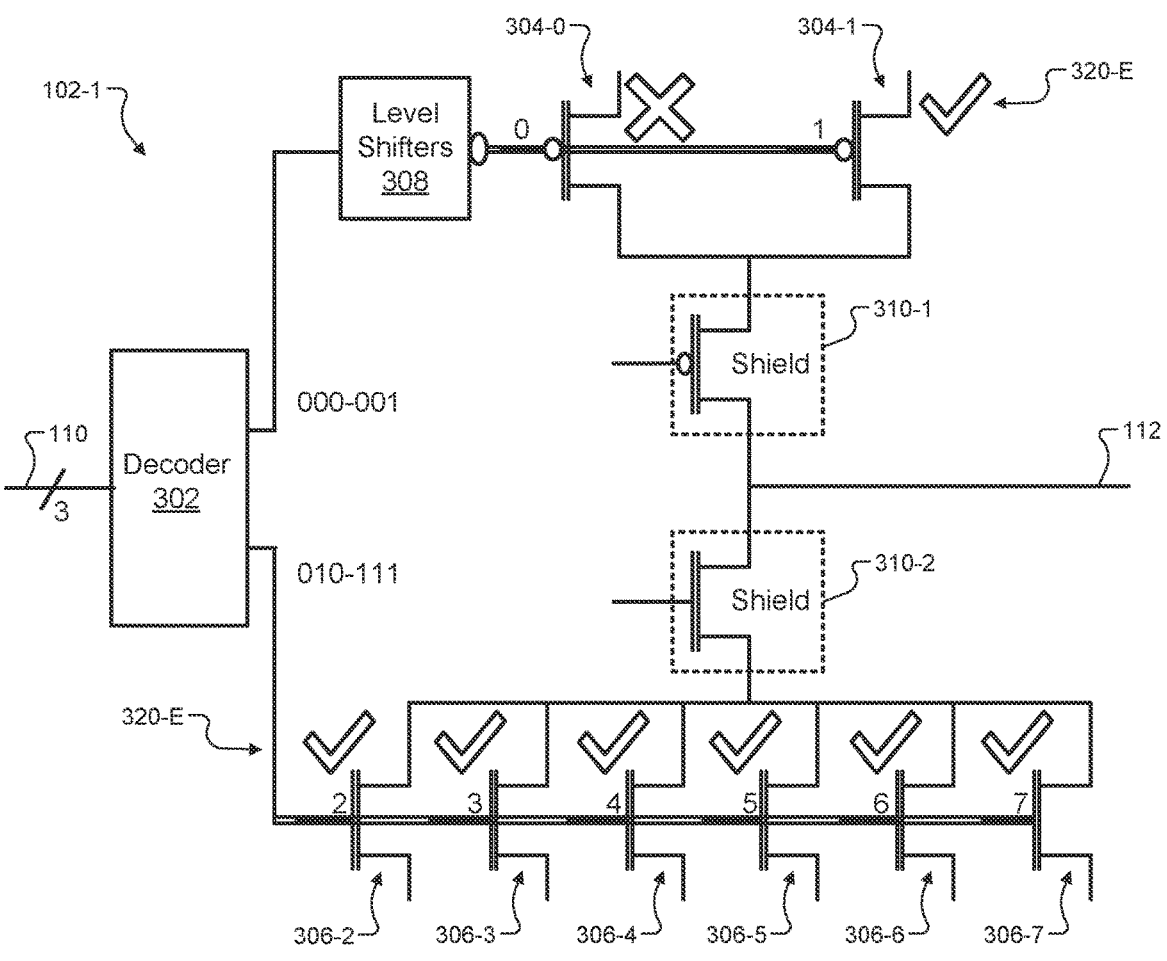
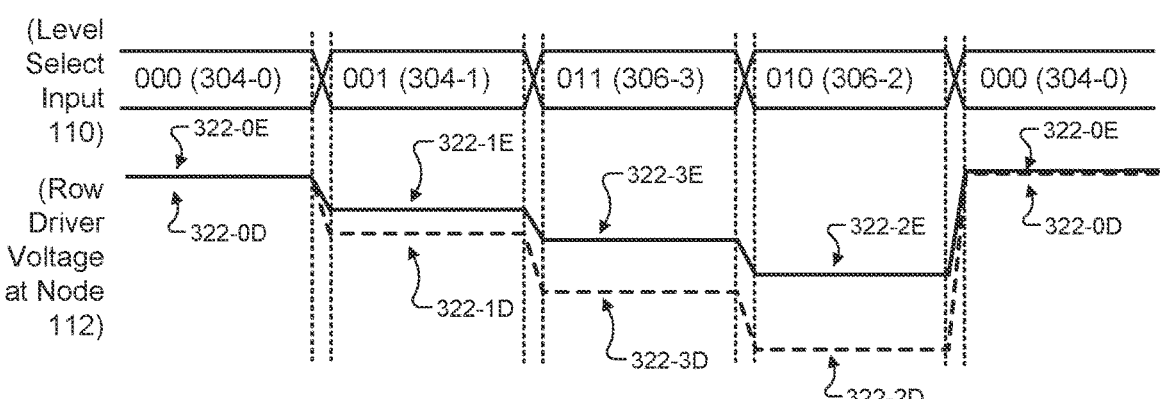
FIG. 3E

330

| Transistor/Defect | Gate Open | S-D Open | S-D Short |
|---|---|---|---|
| 304-0 | Undetected | Detected | Undetected |
| 304-1 | Undetected | Detected | Undetected |
| 306-2 | Undetected | Detected | Undetected |
| 306-3 | Undetected | Detected | Undetected |
| 306-4 | Undetected | Detected | Undetected |
| 306-5 | Undetected | Detected | Undetected |
| 306-6 | Undetected | Detected | Undetected |
| 306-7 | Undetected | Detected | Undetected |
| 310-1 | Safe Fault | Detected | Safe Fault |
| 310-2 | Safe Fault | Detected | Safe Fault |

332

| | |
|---|---|
| Total Faults | 30 |
| Detected | 10 |
| Safe Faults | 4 |
| Undetected Faults | 16 |
| Detection Coverage | 46.7% |

| 110 | XXX (Any Level) | 000 (304-0) | 010 (306-2) | XXX (Any Level) |

| 112 | Any Level | Vhi (322-0) | Vlo (322-2) | Any Level |

| 404-1 | 4V | 0.8V | 4V | |

| 404-2 | | -1V | 1.8V | -1V |

| 406-1 | Floating | Vhi (322-0) | Floating | |

| 406-2 | Floating | | Vlo (322-2) | Floating |

| 412 | Logic '0' | | Logic '1' | Logic '0' |

| 428-1 | Logic '0' | | Logic '1' | Logic '0' |

| 428-2 | Logic '1' | Logic '0' | Logic '1' | |

| 114 | 430-1 | Vhi (322-0) | Vlo (322-2) | 430-1    Logic '0' |

| 420 | 430-2 | Vcomp_Vhi (Eq. 1) | 430-2    Vcomp_Vlo (Eq. 2) | |

| 424 | | Vref (Vhi) | Vref (Vlo) | |

| 436 | Logic '0' | '1' | Logic '0' | '1' |

442-1                442-2

450 —

| Transistor/Defect | Gate Open | S-D Open | S-D Short |
|---|---|---|---|
| 304-0 | Detected | Detected | Detected |
| 304-1 | Detected | Detected | Detected |
| 306-2 | Detected | Detected | Detected |
| 306-3 | Detected | Detected | Detected |
| 306-4 | Detected | Detected | Detected |
| 306-5 | Detected | Detected | Detected |
| 306-6 | Detected | Detected | Detected |
| 306-7 | Detected | Detected | Detected |
| 310-1 | Detected/Safe Fault | Detected | Safe Fault |
| 310-2 | Detected/Safe Fault | Detected | Safe Fault |

452 —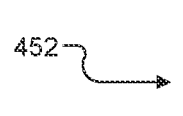

| Total Faults | 30 |
|---|---|
| Detected | 26 |
| Safe Faults | 4 |
| Undetected Faults | 0 |
| Detection Coverage | 100.0% |

FIG. 4C

LEVEL-BASED FAULT DETECTION FOR A ROW DRIVER OF AN OPTICAL SENSOR

TECHNICAL FIELD

This description relates to ways of detecting faults within row driver circuits such as may be implemented within optical sensor devices.

BACKGROUND

Integrated circuits (ICs) may include millions of transistors, capacitors, resistors, and/or other components fabricated on a semiconductor substrate. A cornerstone of modern electronics, these intricate microelectronic systems may perform complex computations and manipulate information to help drive advancements across diverse fields. One type of IC is an optical sensor IC, which may be configured to transform light energy into electrical signals used to perceive and analyze the visual environment so as to evaluate and/or facilitate interaction with objects in that environment. For example, optical sensor ICs may implement image sensors, infrared (IR) sensors, reflective sensors, fiber optic sensors, photoelectric sensors, and/or other suitable types of optical sensor circuits. By capturing spatial variations in light intensity, optical sensor ICs may translate the intricacies of the physical environment into digital representations. In this way, optical sensor ICs may support applications ranging from smartphone photography to extended reality to self-driving vehicles. The functionality and dependability of ICs generally, and optical sensor ICs in particular, may be dependent on how immediately and reliably faults within the ICs can be detected, both during the manufacturing process as well as when new faults develop during operation of the ICs in the field.

SUMMARY

As described herein, an optical sensor IC may include a plurality of row driver circuits (referred to herein as row drivers), as well as circuitry for performing level-based fault detection for the row drivers. This latter circuitry may be dedicated to individual row drivers, shared between two or more row drivers (up to and including being shared between all the row drivers), or a combination of both of these. The circuitry used to perform fault detection for a given row driver is referred to herein as a fault detection system, and it will be understood that a plurality of such fault detection systems may be integrated into an optical sensor IC to perform level-based fault detection for a plurality of row drivers. Each such fault detection system may include certain circuits or circuitry dedicated to a particular row driver, as well as other circuits or circuitry shared by two or more row drivers, as described and illustrated in detail herein.

In one example implementation, a fault detection system for a row driver of an optical sensor may include an input node, a transport circuit, and a comparison circuit. The input node may be electrically connected to the row driver, which may produce, on the input node, a row driver voltage having one of a plurality of analog voltage levels. The transport circuit may be configured to transport, when the row driver is selected from a plurality of row drivers, the row driver voltage to a monitoring node shared by a plurality of fault detection systems including the fault detection system. The comparison circuit may be shared by the plurality of fault detection systems and may be configured to generate a digital output based on the row driver voltage and a reference voltage. For example, the comparison circuit may generate the digital output by conditioning a voltage from the monitoring node, performing a comparison between the conditioned voltage and the reference voltage, latching the digital output based on the comparison, and/or other such operations described herein.

A fault detection system for a row driver, such as the example implementation described above, may include a variety of additional elements, features, characteristics, or the like.

As one example, the row driver may be configured to activate a plurality of transistors one at a time so that the row driver voltage is driven at: 1) a first voltage level of the plurality of analog voltage levels when a first PMOS transistor of the plurality of transistors is activated; 2) a second voltage level of the plurality of analog voltage levels when a second PMOS transistor of the plurality of transistors is activated; 3) a third voltage level of the plurality of analog voltage levels when a first NMOS transistor of the plurality of transistors is activated; and 4) a fourth voltage level of the plurality of analog voltage levels when a second NMOS transistor of the plurality of transistors is activated. In this way, the row driver may operate as an analog multiplexer for the plurality of analog voltage levels (including the first, second, third, and fourth voltage levels, as well as any other analog voltage levels as may serve a particular implementation). In this example, the digital output may include a first output bit determined at a first time when the reference voltage has a first reference level. The first output bit in this case may indicate whether a defect is detected in the first NMOS transistor or the second NMOS transistor. The digital output in this example may also include a second output bit determined at a second time when the reference voltage has a second reference level. The second output bit may indicate whether a defect is detected in the first PMOS transistor or the second PMOS transistor. In some implementations, the comparison circuit in this example may include a storage circuit configured to store and output the first output bit and the second output bit of the digital output.

As another example, the transport circuit may include a first routing transistor and a second routing transistor. Collectively, these routing transistors may be configured to route the row driver voltage to the monitoring node either: 1) by way of a first path through the first routing transistor when an analog voltage level of the row driver voltage is greater than a threshold level, or 2) by way of a second path through the second routing transistor when the analog voltage level of the row driver voltage is less than the threshold level. In this example, the transport circuit may further include: a first shield transistor configured to protect the first routing transistor from voltage levels outside a first operating range of the first routing transistor; and a second shield transistor configured to protect the second routing transistor from voltage levels outside a second operating range of the second routing transistor.

As another example, the transport circuit may include: 1) a first monitor selection transistor that, when activated, connects the monitoring node to a first path by way of which the row driver voltage is routed when an analog voltage level of the row driver voltage is greater than a threshold level; 2) a second monitor selection transistor that, when activated, connects the monitoring node to a second path by way of which the row driver voltage is routed when the analog voltage level of the row driver voltage is less than the threshold level; and 3) a control node on which a control signal is received, the control signal being configured to control activation of the first monitor selection transistor and the second monitor selection transistor. In this example, the control signal may be configured to control activation of the first monitor selection transistor and the second monitor selection transistor in accordance with a pre-charge phase and an evaluation phase of a period when the row driver is selected from the plurality of row drivers. Also in this example, the control signal may be configured to control activation of the first monitor selection transistor and the second monitor selection transistor in accordance with a protection period when a different row driver other than the row driver is selected from the plurality of row drivers.

As another example, the comparison circuit may include: 1) a first capacitor electrically connected to the monitoring node; 2) a second capacitor electrically connected between the first capacitor and ground; 3) a conditioned monitoring node between the first capacitor and the second capacitor; 4) a comparator device connected to the conditioned monitoring node and a reference node for the reference voltage; 5) a first reference control transistor that, when activated, connects a first scaling reference node to the monitoring node; and 6) a second reference control transistor that, when activated, connects a second scaling reference node to the conditioned monitoring node. In this example, the comparison circuit may further include a storage circuit connected to an output of the comparator device and configured to latch the digital output based on an enable signal and to store and output the digital output.

In another example implementation, an optical sensor integrated circuit (IC) may include: a plurality of row drivers including a row driver configured to produce a row driver voltage, as well as a plurality of fault detection systems for the plurality of row drivers. The plurality of fault detection systems in this implementation may include a fault detection system for (dedicated to) the row driver, as well as other fault detection systems dedicated to other row drivers of the plurality of row drivers. The fault detection system may include: 1) an input node electrically connected to the row driver to receive the row driver voltage, 2) a monitoring node shared by the plurality of fault detection systems, 3) a transport circuit configured to receive the row driver voltage from the input node and transport the row driver voltage to the monitoring node when the row driver is selected from the plurality of row drivers, and 4) a comparison circuit shared by the plurality of fault detection systems, the comparison circuit being configured to receive the row driver voltage via the monitoring node and to generate the digital output based on the row driver voltage and a reference voltage. This generating of the digital output may be performed by conditioning a voltage from the monitoring node, performing a comparison between the conditioned voltage and the reference voltage, latching the digital output based on the comparison, and/or other such operations described herein.

An optical sensor IC implementation, such as the example implementation described above, may include a variety of additional elements, features, characteristics, or the like.

As one example, the row driver may be configured to activate a plurality of transistors one at a time so that the row driver voltage is driven at: 1) a first voltage level when a first PMOS transistor of the plurality of transistors is activated; 2) a second voltage level when a second PMOS transistor of the plurality of transistors is activated; 3) a third voltage level when a first NMOS transistor of the plurality of transistors is activated; and 4) a fourth voltage level when a second NMOS transistor of the plurality of transistors is activated. The first and second PMOS transistors and the first and second NMOS transistors may all be different transistors of the plurality of transistors. In this example, the digital output may include a first output bit determined at a first time when the reference voltage has a first reference level. The first output bit may indicate whether a defect is detected in the first NMOS transistor or the second NMOS transistor. The digital output in this example may also include a second output bit determined at a second time when the reference voltage has a second reference level. This second output bit may indicate whether a defect is detected in the first PMOS transistor or the second PMOS transistor.

As another example, the transport circuit may include a first routing transistor and a second routing transistor collectively configured to route the row driver voltage to the monitoring node. The first and second transistors may perform this routing either: 1) by way of a first path through the first routing transistor when an analog voltage level of the row driver voltage is greater than a threshold level, or 2) by way of a second path through the second routing transistor when the analog voltage level of the row driver voltage is less than the threshold level.

As another example, the transport circuit may include: 1) a first monitor selection transistor that, when activated, connects the monitoring node to a first path by way of which the row driver voltage is routed when an analog voltage level of the row driver voltage is greater than a threshold level; 2) a second monitor selection transistor that, when activated, connects the monitoring node to a second path by way of which the row driver voltage is routed when the analog voltage level of the row driver voltage is less than the threshold level; and 3) a control node on which a control signal is received, the control signal configured to control activation of the first monitor selection transistor and the second monitor selection transistor.

In another example implementation, a method for level-based fault detection for a row driver of an optical sensor may include: 1) receiving, at an input node of a fault detection system that is electrically connected to a row driver of a plurality of row drivers, a row driver voltage; 2) transporting, by a transport circuit within the fault detection system and based on a selection of the row driver from the plurality of row drivers, the row driver voltage to a monitoring node shared by a plurality of fault detection systems including the fault detection system; and 3) generating, by a comparison circuit shared by the plurality of fault detection systems, a digital output by conditioning a voltage from the monitoring node, performing a comparison between the conditioned voltage and a reference voltage, and latching the digital output based on the comparison.

A method for level-based fault detection, such as the example method implementation described above, may include a variety of additional elements, features, characteristics, or the like.

As one example, the row driver may be configured to activate a plurality of transistors of the row driver one at a time so that the row driver voltage is driven at: 1) a first voltage level when a first PMOS transistor of the plurality of transistors is activated, 2) a second voltage level when a second PMOS transistor of the plurality of transistors is activated, 3) a third voltage level when a first NMOS transistor of the plurality of transistors is activated, and 4) a fourth voltage level when a second NMOS transistor of the plurality of transistors is activated. The first and second PMOS transistors and the first and second NMOS transistors may all be different transistors of the plurality of transistors. In this example, the generating of the digital output may include determining, at a first time when the reference voltage has a first reference level, a first output bit of the digital output. The first output bit may indicate whether a defect is detected in the first NMOS transistor or the second NMOS transistor. The generating of the digital output in this example may also include determining, at a second time when the reference voltage has a second reference level, a second output bit of the digital output. This second output bit may indicate whether a defect is detected in the first PMOS transistor or the second PMOS transistor.

As another example, the transporting of the row driver voltage to the monitoring node in the method may include routing the row driver voltage either: 1) by way of a first path through a first routing transistor within the transport circuit when an analog voltage level of the row driver voltage is greater than a threshold level, or 2) by way of a second path through a second routing transistor within the transport circuit when the analog voltage level of the row driver voltage is less than the threshold level. Moreover, the method may also include, in this example: 1) connecting, by a first monitor selection transistor when the first monitor selection transistor is activated, the monitoring node to the first path; 2) connecting, by a second monitor selection transistor when the first monitor selection transistor is activated, the monitoring node to the second path; and 3) controlling, by a control signal received on a control node, activation of the first monitor selection transistor and the second monitor selection transistor.

The details of these and other implementations are set forth in the accompanying drawings and the description below. Other features will also be apparent from the following description, drawings, and claims.

BRIEF DESCRIPTION OF THE DRAWINGS

FIG. 2 shows an illustrative method for level-based fault detection for a row driver of an optical sensor in accordance with principles described herein.

FIG. 3B shows illustrative aspects of certain operations by a row driver without any defect in accordance with principles described herein.

FIG. 3C shows illustrative aspects of certain operations by a row driver with a defect in an NMOS transistor in accordance with principles described herein.

FIG. 3D shows illustrative aspects of other operations by a row driver without any defect in accordance with principles described herein.

FIG. 3E shows illustrative aspects of other operations by a row driver with a defect in a PMOS transistor in accordance with principles described herein.

FIG. 3F shows an illustrative table indicating fault detection capabilities of a non-level-based fault detection approach in accordance with principles described herein.

FIG. 4C shows an illustrative table indicating fault detection capabilities of a level-based fault detection approach in accordance with principles described herein.

DETAILED DESCRIPTION

Figure 1:
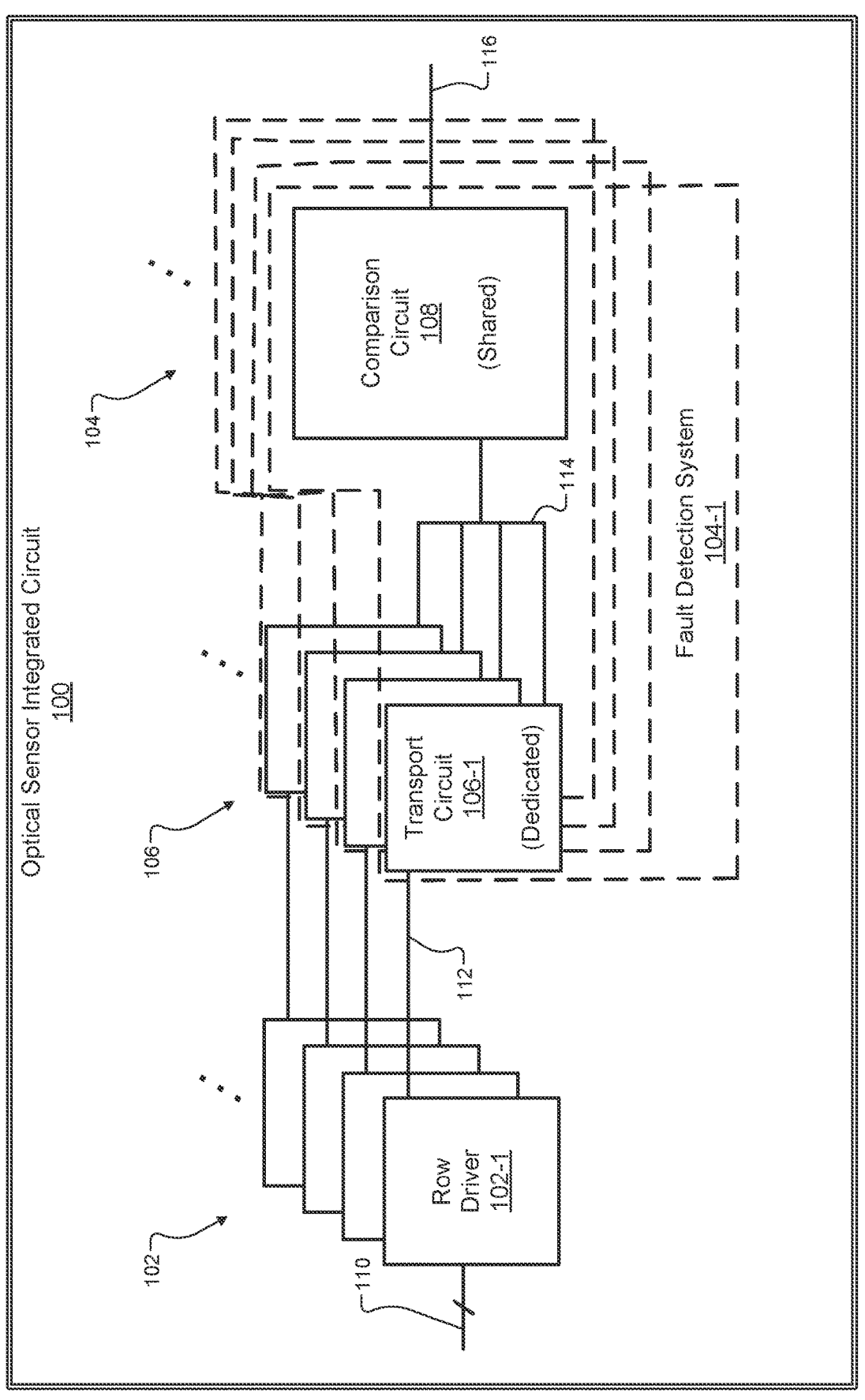
FIG. 1 shows a block diagram of an illustrative image sensor integrated circuit configured to perform level-based fault detection for a plurality of row drivers in accordance with principles described herein.

Systems, circuits, and methods for level-based fault detection for a row driver of an optical sensor are described herein. With any integrated circuit (IC), including an optical sensor IC, electronic components within the IC are prone to failure either when being fabricated at a manufacturing stage or later in the lifetime of the IC. For example, transistors or other electronic components may be fabricated with, or may develop after a certain amount of time, various faults or defects including open defects whereby the component loses a capability to properly conduct current, short defects whereby the component loses a capability to properly block or resist current, gate defects whereby the component loses a capability to be properly controlled, and so forth.

Depending on the application or use case for which a particular IC is intended, a certain integrity level may be desired or required to guarantee a certain reliability associated with the IC in operation. For example, for an IC used in an inexpensive electronic device, the integrity level desired or required of the IC may not be especially demanding. On the other hand, for an IC used in a more sophisticated and/or high-stakes application, such as within a decision chain of a self-driving vehicle, the integrity level desired or required of the IC may be significantly more demanding to achieve safety objectives and ensure other equipment functions properly. In any of these or other scenarios, a variety of manufacturing tests and operational tests may be applied to various circuits and functional blocks and components within an IC to ensure that a desired or required integrity level is met and maintained. As described and illustrated in detail herein, level-based fault detection for a row driver of an optical sensor is one type of integrity test that may be built into an IC and applied throughout a lifetime of the IC to provide a high degree of test coverage for components of row drivers within the optical sensors and to ensure that these row drivers meet and maintain whatever integrity level may be desired or required for a given IC application.

Certain optical sensors may be constructed in a grid with row circuitry and column circuitry configured to detect light across an array of pixels on the sensors. Row circuitry in such optical sensors may be responsible for a variety of tasks such as proper decoding of the row address, checking for proper voltage levels of low-dropout (LDO) voltage regulators, verifying the integrity of pixel control signals across the pixel array, and so forth. Proper operation of such circuitry may be continually monitored throughout the lifetime of an optical sensor IC, but doing so requires additional fault detection circuitry that may consume significant area of the limited substrate footprint, may use significant power of the IC's power budget, may increase the complexity of manufacturing, and so forth. Additionally, as will be illustrated and described in more detail below, conventional fault detection circuitry may only be well-suited for detecting certain types of faults, while other faults may be masked or otherwise evade detection.

To address these challenges, level-based fault detection described herein is configured to provide significantly greater test coverage than conventional approaches while being highly efficient in terms of area usage, power usage, manufacturing complexity, and so forth. For example, benefits provided by level-based fault detection systems and methods described herein may include, without limitation: 1) helping to achieve 100% defect detection for row driver circuitry so as to meet high integrity level requirements and ensure safety and proper operation of optical sensors throughout their lifetimes; 2) implementing certain function-ality with circuitry dedicated to individual row drivers while implementing other functionality with shared circuitry that is multiplexed to serve many row drivers; 3) using relatively small transistors integrated in the sensor next to the row driver to optimize area usage; 4) sharing comparator, scal-ing, level-shifting, and other functionality across multiple or all rows to minimize area and power usage for these func-tions as compared to using dedicated circuitry for each row; 5) minimizing routing and manufacturing complexity by achieving defect testing on chip near the row circuitry to avoid additional routing and/or excessive pins to pass sig-nals between dies in a stacked die configuration; and/or 6) allowing efficient and convenient scaling of defect coverage by sharing key components between rows and placing them proximate to the row circuitry they serve.

Various implementations will now be described in more detail with reference to the figures. It will be understood that the particular implementations described below are provided as non-limiting examples and may be applied in various situations. Additionally, it will be understood that other implementations not explicitly described herein may also fall within the scope of the claims set forth below. Optical sensor ICs employing level-based fault detection for their row drivers and related methods for level-based fault detec-tion may result in any or all of the technical benefits mentioned above, as well as various additional technical benefits that will be described and/or made apparent below.

FIG. 1 shows a block diagram of an illustrative optical sensor integrated circuit (IC) 100 configured to perform level-based fault detection for a plurality of row drivers in accordance with principles described herein. As will be described and set forth below, optical sensor ICs such as optical sensor IC 100 may be implemented in a variety of ways and with a variety of optional features that may be used in any combination as may serve a particular implementa-tion. The block diagram of optical sensor IC 100 in FIG. 1 is therefore presented as a high-level representation of certain features that may be common to many or all of the optical sensor IC implementations described herein, and various additional implementations with different specific features and combinations of features will be described and illustrated below utilizing the same or related reference numbers as those introduced in relation to FIG. 1.

As shown in FIG. 1, optical sensor IC 100 includes a plurality of row drivers 102 that include a row driver 102-1 (in the front of the stack) and various other row drivers 102 (drawn behind row driver 102-1 and not individually labeled in FIG. 1). Similarly, a plurality of fault detection systems 104 for the plurality of row drivers 102 is shown to each be outlined with dashed lines. The plurality of fault detection systems 104 is shown to include a fault detection system 104-1 corresponding to row driver 102-1 (in the front of the stack), as well as other fault detection systems 104 (drawn behind fault detection system 104-1 and not individually labeled in FIG. 1). As further shown in FIG. 1, a plurality of transport circuits 106 dedicated to individual row drivers 102 are all electrically coupled with a comparison circuit 108 that is shared by all the transport circuits 106 and their respective row drivers 102. More particularly, as shown, each fault detection system 104 includes a dedicated trans-port circuit 106, while sharing access to the one comparison circuit 108 being shared by all the rows. For example, fault detection system 104-1 is shown to include a transport circuit 106-1 (in the front of the stack) that will be under-stood to be dedicated for use by row driver 102-1 and to belong to fault detection system 104-1 alone. However, fault detection system 104-1 is also shown to include comparison circuit 108. This will be understood to indicate a usage that is shared with other fault detection systems 104 that also include (share) this same comparison circuit.

Optical sensor IC 100 is shown in FIG. 1 to include respective pluralities of row drivers 102 and fault detection systems 104 with their dedicated transport circuits 106 and shared use of comparison circuit 108. However, for clarity and convenience of description and illustration, the follow-ing description will focus, in particular, on row driver 102-1 and fault detection system 104-1.

As shown, row driver 102-1 receives a level select input 110 and produces a row driver voltage at a node 112. An output of row driver 102-1, node 112 is shown to be an input of the fault detection system 104-1 that is dedicated to row driver 102-1. As such, node 112 will also be referred to herein as input node 112. As shown, input node 112 may electrically connect row driver 102-1 to the transport circuit 106-1 of fault detection system 104-1 to allow the transport circuit to receive the row driver voltage. As will be described and illustrated in more detail below, the row driver voltage produced on input node 112 by row driver 102-1 may have one of a plurality of analog voltage levels based on the digital value of level select input 110.

When row driver 102-1 is selected from the plurality of row drivers 102 (such as for pixel readout or other opera-tions that each row is sequentially selected to perform in turn), transport circuit 106-1 may be configured to transport the row driver voltage to a monitoring node 114 that is shared by transport circuit 106-1 and the other plurality of transports circuits 106, as shown. As a result, monitoring node 114 may be referred to herein as a shared monitoring node. Monitoring node 114 is shown to electrically connect the plurality of transports circuits 106 to comparison circuit 108, which is also shared by all the plurality of fault detection systems 104 and may be referred to herein as a shared comparison circuit.

Comparison circuit 108 may be configured to generate a digital output 116. For example, as will be described in more detail below, comparison circuit 108 may generate digital output 116 by performing operations including, for instance: 1) conditioning a voltage from shared monitoring node 114, 2) performing a comparison between the conditioned volt-age and a reference voltage, 3) latching digital output 116 based on the comparison, and/or other operations described herein or as may serve a particular implementation.

FIG. 2 shows an illustrative method 200 for level-based fault detection for a row driver of an optical sensor in accordance with principles described herein. While FIG. 2 shows illustrative operations 202-206 and suboperations 208-212 according to one implementation, other implemen-tations of method 200 may omit, add to, reorder, and/or modify any of the operations 202-206 and/or suboperations 208-212 shown in FIG. 2. In some examples, multiple operations shown in FIG. 2 or described in relation to FIG. 2 may be performed concurrently (e.g., in parallel) with one another, rather than being performed sequentially as illus-trated and/or described. Each of operations 202-206 and suboperations 208-212 will now be described in more detail as they may be performed by an implementation of optical sensor IC 100 or, more particularly, by an implementation of one of fault detection systems 104 such as fault detection system 104-1.

At operation 202, fault detection system 104-1 may receive a row driver voltage at an input node of the fault detection system that is electrically connected to a row driver of a plurality of row drivers. For example, the input node may be the input node 112 shown in FIG. 1. The row driver voltage may have one of a plurality of analog voltage levels. More particularly, as will be described and illustrated in more detail below, the row driver may be configured to operate as an analog multiplexer for the plurality of analog voltage levels by activating one transistor at a time of a plurality of transistors within the row driver. For example, the row driver voltage may be driven at any of 1) a first voltage level of the plurality of analog voltage levels when a first PMOS transistor of the plurality of transistors is activated; 2) a second voltage level of the plurality of analog voltage levels when a second PMOS transistor of the plurality of transistors is activated; 3) a third voltage level of the plurality of analog voltage levels when a first NMOS transistor of the plurality of transistors is activated; 4) a fourth voltage level of the plurality of analog voltage levels when a second NMOS transistor of the plurality of transistors is activated; or 5) another suitable analog voltage level associated with another transistor of the plurality of transistors.

At operation 204, fault detection system 104-1 may use a transport circuit such as transport circuit 106-1 to transport the row driver voltage from the input node to a monitoring node, such as monitoring node 114, that is shared by a plurality of fault detection systems 104 including fault detection system 104-1. The transporting of the row driver voltage by the transport circuit may be performed based on a selection of the row driver from the plurality of row drivers. For example, since monitoring node 114 may be shared by many fault detection systems (one for each of the rows of pixels on the optical sensor IC), a controller may track when it is the turn of fault detection system 104-1 to drive the monitoring node and when it is the turn of fault detection systems 104 other than fault detection system 104-1. When its turn comes up, fault detection system 104-1 may be selected as the circuit assigned to use and control the shared monitoring node and the shared comparison circuit. At this time, the transport circuit may direct for the row driver voltage to be driven onto the shared monitoring node in a manner that accounts for operating ranges of various components to abstain from putting undue stress on these components, as will be described in more detail below. At other times, when it is not the turn of fault detection system 104-1 and it is not selected, the transport circuit may be configured to isolate the row driver voltage from the shared monitoring node as other fault detection systems 104 take their turns using the node.

At operation 206, fault detection system 104-1 may use a comparison circuit such as comparison circuit 108 to generate a digital output. As was shown in FIG. 1 for the example of comparison circuit 108, the comparison circuit used at operation 206 may be shared by the plurality of fault detection systems 104. For example, similarly as described above for the shared monitoring node, use of the comparison circuit may be arbitrated by a selection mechanism that manages the fault detection systems in taking turns to use the comparison circuit, or, in other words, selects and grants respective time periods for each fault detection system to access and use these shared resources. When fault detection system 104-1 is selected in this way, the digital output may be generated by the comparison circuit in any suitable manner. For example, operation 206 is shown to include three suboperations 208, 210, and 212 that may be performed as part of operation 206.

For suboperation 208, the comparison circuit may condition a voltage from the monitoring node. For example, this conditioning may include level shifting the voltage to a level suitable for an operating range of a comparator device that will be used to analyze the voltage level at suboperation 210. Additionally, the conditioning at suboperation 208 may include scaling the voltage in preparation for it to be compared to a particular reference level. As will be described and illustrated in more detail below, this voltage conditioning may involve a network of capacitors that are pre-charged using one or more reference voltages to generate a conditioned voltage that is suitably level-shifted and scaled to represent the voltage level of the row driver voltage for suboperation 210.

At suboperation 210, the comparison circuit may perform a comparison between the conditioned voltage produced at suboperation 208 and a reference voltage. For example, the reference voltage may be selected such that, when compared to the conditioned voltage, any faults or defects that happen to be present in the row driver will be detected based on an unexpected voltage level of the conditioned voltage. As will be described and illustrated in more detail below, for instance, one reference voltage may be selected for use in detecting whether any fault or defect exists in the NMOS transistors of the row driver, while a different reference voltage may be selected for use in detecting whether any fault or defect exists in any of the PMOS transistors of the row driver. The comparison may be performed by a comparator component that receives the conditioned voltage and the proper reference voltage (depending on which transistors are currently being tested) as input, and that then outputs a voltage indicating whether the comparison is as expected (such that no defect is detected) or is not as expected (such that a defect is detected).

For suboperation 212, the comparison circuit may latch the digital output based on the comparison. For example, since at least two tests may be performed by the same comparison circuit for each row (tests for the PMOS transistors and for the NMOS transistors, as mentioned above and described in more detail below), test results may be recorded and stored by latching individual voltages output by the comparator component for each test. The digital output may thus include two bits representing the test results for a given row, which may then feed into other circuits, storage facilities, or the like. Ultimately, the digital output latched at suboperation 212 may be used to allow information obtained by pixels on the row served by row driver 102-1 to be relied on to the extent that the row driver has been verified to be operating reliably and free of defects.

Figure 3A:
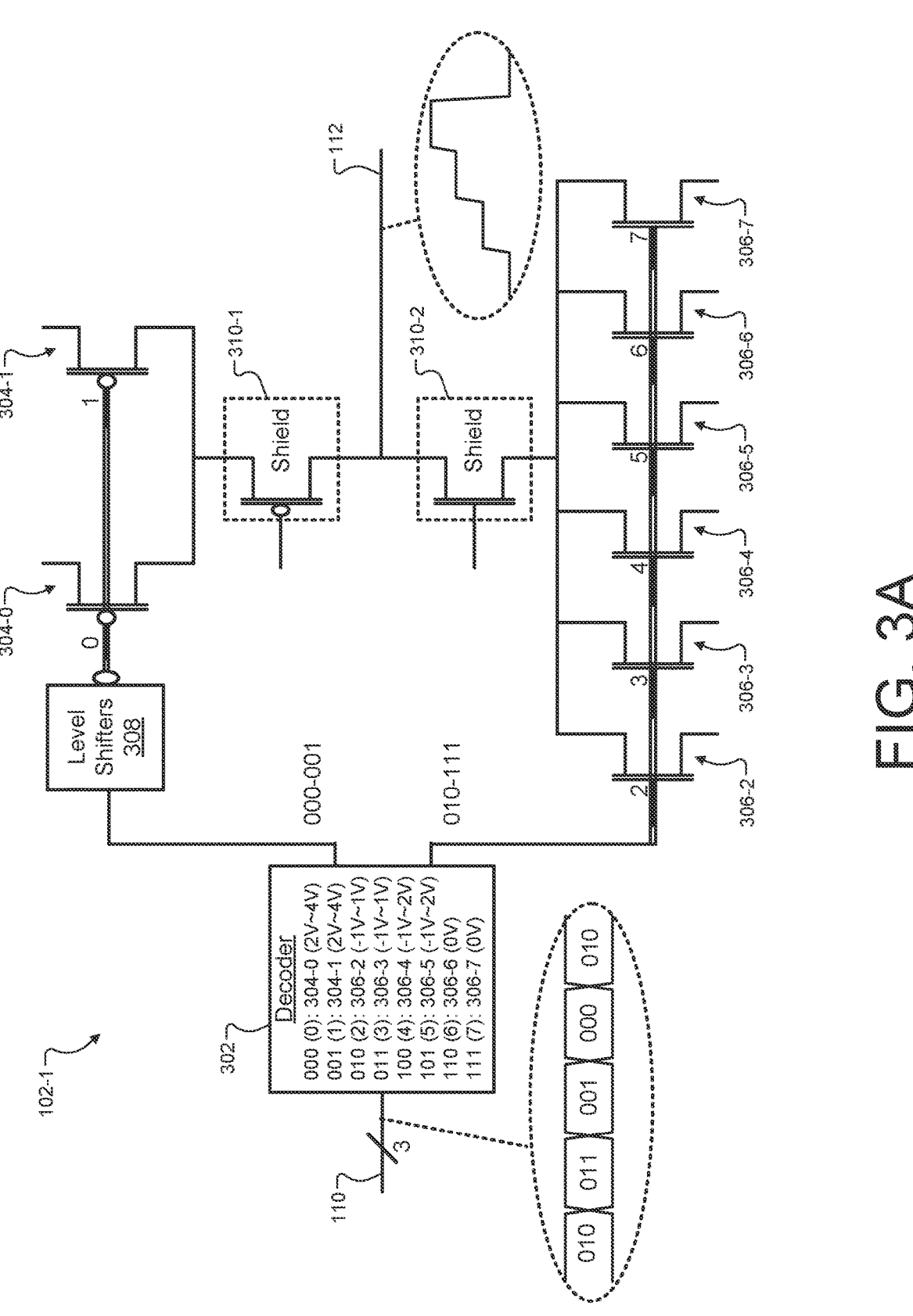
FIG. 3A shows illustrative circuitry for an example row driver in accordance with principles described herein.

FIG. 3A shows illustrative circuitry for an example row driver in accordance with principles described herein. More particularly, as shown, an implementation of row driver 102-1 is shown in FIG. 3A to receive level select input 110 and to output the row driver voltage on node 112. As mentioned above, node 112 will be understood to serve as the output node of row driver 102-1, though it is referred to elsewhere as input node 112 since this output is the input for a fault detection system (fault detection system 104-1 in this example).

Row driver 102-1 may be configured to act as an analog multiplexer that converts various digital values into an analog voltage with different corresponding voltage levels. For example, if a row of pixels is configured to perform actions such as capturing light information, reading out captured information, clearing the pixels to prepare for a subsequent image, transporting or partially transporting data, and so forth, the row driver for that row of pixels may be configured to provide a signal having a row driver voltage with a particular analog voltage value to indicate which of these functions is to be performed at a given time. In one implementation, for instance, a row driver may be configured to produce a row driver voltage having up to eight different analog values corresponding to eight different functions of the pixels being driven on that row. Accordingly, the function of a row driver such as row driver 102-1 may be to receive a digital input signal that can have a certain number of possible digital values and to produce an analog signal with a voltage level corresponding to the present digital value on the input line.

To this end, the example of row driver 102-1 shows that level select input 110 may be a 3-bit digital input capable of representing up to eight different digital values. Example 3-bit values for the signal are illustrated by an example waveform in a dotted circle drawn below level select input 110, and a decoder 302 that receives level select input 110 is illustrated with a table showing voltage ranges to be output for the various possible digital input values. Specifically, as shown on decoder 302 for this example, a row driver voltage with a value between 2V and 4V may be output on node 112 for a digital value 0b000 ('0') or a digital value 0b001 ('1') on level select input 110; a row driver voltage with a value between-1V and 1V may be output on node 112 for a digital value 0b010 ('2') or a digital value 0b011 ('3') on level select input 110; a row driver voltage with a value between-1V and 2V may be output on node 112 for a digital value 0b100 ('4') or a digital value 0b101 ('5') on level select input 110; and a row driver voltage with a value of 0V (ground) may be output on node 112 for a digital value 0b110 ('6') or a digital value 0b111 ('7') on level select input 110.

In some implementations, row driver 102-1 could be configured to provide the same analog voltage level for the row driver voltage for two or more different digital values. For example, row driver 102-1 may be configured such that a level select input value of either 0b000 ('0') or 0b001 ('1') result in a same row driver voltage output of 3V. In other implementations, row driver 102-1 could be configured to provide different analog voltage levels for the row driver voltage for different digital values. For example, row driver 102-1 may be configured such that a level select input value of 0b000 ('0') results in a row driver voltage of 3V, while a level select input value of 0b001 ('1') results in a row driver voltage output of 4V.

The example waveform attached to node 112 may correspond to the example values illustrated in the waveform attached to level select input 110. Collectively, these waveforms thus illustrate that the analog voltage value of the row driver voltage driven onto node 112 may reflect a relatively wide range of voltages, such as from –1V up to 4V in this example. This voltage range may be wider than the operating range of any particular device used to drive or process the voltage, such as any single PMOS or NMOS transistor. However, by combining complementary PMOS and NMOS transistors that are powered at different voltage levels, the wide range of voltage values desired for node 112 may be achieved. Accordingly, in this example, row driver 102-1 is configured to operate as an analog multiplexer for a plurality of analog voltage levels (such as shown in the waveform of node 112 and/or as indicated in the table of decoder 302) by activating one transistor at a time of a plurality of transistors included in row driver 102-1. In this particular implementation, FIG. 3A shows that this plurality of transistors includes two PMOS transistors 304-0 and 304-1 (collectively referred to as PMOS transistors 304) and six NMOS transistors 306-2, 306-3, 306-4, 306-5, 306-6, and 306-7 (collectively referred to as NMOS transistors 306), for a total of eight transistors corresponding to the eight possible digital values of level select input 110.

By activating only one of these eight transistors at a time based on level select input 110, decoder 302 may effectively select or multiplex the voltages supplying each of these transistors to be driven on node 112. As one particular example based on the values shown in FIG. 3A, the row driver voltage at node 112 could be driven at: a first voltage level (such as 4V) when PMOS transistor 304-0 is activated, a second voltage level (such as 3V) when PMOS transistor 304-1 is activated, a third voltage level (such as 1V) when NMOS transistor 306-2 is activated, a fourth voltage level (such as –1V) when NMOS transistor 306-3 is activated, a fifth voltage level (such as 2V) when either NMOS transistors 306-4 or 306-5 is activated, and a sixth voltage level (such as 0V) when either of NMOS transistors 306-6 or 306-7 is activated. It will be understood that these voltage levels are offered only by way of example and that any suitable voltage levels may be associated with each digital input value as may serve a particular implementation.

Additional components besides decoder 302 and the plurality of transistors 304 and 306 may also be included in a row driver implementation as may serve a particular implementation. For example, certain circuit elements may serve various functions to facilitate, support, or enable the main functionality of the row driver circuit that has been described. For example, as shown in FIG. 3A, row driver 102-1 may include level shifters 308 configured to shift a voltage level output by decoder 302 to a suitable voltage level for activating PMOS transistors 304 when applied to the gates of these transistors. It will be assumed for this example implementation that no similar level shifting is necessary for activating NMOS transistors 306, though that may not necessarily be the case in other implementations. Additionally, shield transistors 310-1 and 310-2 are shown to be included between node 112 and the different sets of PMOS transistors 304 and NMOS transistors 306. As with other shield transistors described herein, shield transistors 310-1 and 310-2 may function to ensure that no component of row driver 102-1 is stressed with a voltage outside its operational range.

When properly configured in the manner that has been described, only one of transistors 304 or 306 are activated at a time (based on the incoming value of level select input 110) and a row driver voltage having a desired analog voltage level is thereby driven onto node 112. However, if a fault or defect is present in one or more of transistors 304 or 306, due either to a problem arising in the fabrication process or to an issue that develops in the field after manufacturing, the analog voltage level of the row driver voltage on node 112 may be incorrect. To illustrate, FIGS. 3B-3E show desired and defective outcomes for two example scenarios, one in which one of NMOS transistors 306 is the defective transistor and the other in which one of PMOS transistors 304 is the defective transistor. More particularly, FIG. 3B shows a sequence of illustrative operations performed by row driver 102-1 when no defect is present, while FIG. 3C shows the same operations by row driver 102-1 when there is a defect such as a short in one of NMOS transistors 306. FIG. 3D then shows a new sequence of illustrative operations performed by row driver 102-1 when no defect is present, and FIG. 3E shows the same operations by row driver 102-1 when there is a defect such as a short in one of PMOS transistors 304.

In each of FIGS. 3B-3E, the plurality of transistors 304 and 306 are shown to include respective defect indicators 320 to indicate whether the transistors in the particular example are properly functioning or are associated with a fault or defect. Specifically, a check mark next to a transistor will be understood to indicate that no defect has compromised that particular transistor for the given example, while an 'X' mark next a transistor will be understood to indicate that a short defect has compromised the transistor for the purposes of the present example. To differentiate the different defect indicators in the different figures, the letter of the figure is used in connection with the reference numbers of defect indicators 320. That is, defect indicators 320-B show the particular status of transistors in the example of FIG. 3B, defect indicators 320-C show the particular status of the transistors in the example of FIG. 3C, defect indicators 320-D show the particular status of the transistors in the example of FIG. 3D, and defect indicators 320-E show the particular status of the transistors in the example of FIG. 3E.

The sequence of level select input values on level select input 110 is indicated in the waveform below row driver 102-1 in each of FIGS. 3B-3E along with the row driver voltages that are being driven onto node 112 to indicate these values. In the examples of FIGS. 3B and 3C, this sequence goes from 0b010 ('2') to 0b011 ('3') to 0b001 ('1') to 0b000 ('0') back to 0b010 ('2'). As shown parenthetically on the waveform in connection with each of these digital values, a particular transistor 304 or 306 is activated by decoder 302 for each of these digital values. For example, the 0b010 ('2') digital value causes NMOS transistor 306-2 to be activated, the 0b000 ('0') digital value causes PMOS transistor 304-0 to be activated, and so forth. Based on the regulated or ground voltages powering these various transistors (not explicitly shown), an analog voltage level 322 corresponding to that transistor is applied to the row driver voltage at node 112 as illustrated in the waveform below the sequence of level select input 110 values ("Row Driver Voltage at Node 112").

In FIG. 3B, defect indicators 320-B show that both of PMOS transistors 304 and all of NMOS transistors 306 are free of defects and fully functional. Accordingly, the waveforms show that an analog voltage level 322-2B corresponds with the selection of 0b010 ('2') on the input, an analog voltage level 322-3B corresponds with the selection of 0b011 ('3') on the input, an analog voltage level 322-1B corresponds with the selection of 0b001 ('1') on the input, an analog voltage level 322-0B corresponds with the selection of 0b000 ('0') on the input, and the same analog voltage level 322-2B again corresponds with the selection of 0b010 ('2') on the input at the end of the illustrated sequence. This will be understood to represent the desired and defect-free operation of row driver 102-1 for this sequence of inputs.

In contrast, FIG. 3C uses the same input sequence to illustrate the outcome when a defect is present on one of the NMOS transistors 306. Specifically, in FIG. 3C, defect indicators 320-C show that, while both PMOS transistors 304 and all of NMOS transistors 306-3 through 306-7 are free of defects and fully functional, NMOS transistor 306-2 includes a defect. More particularly, the defect in NMOS transistor 306-2 will be understood to be a short defect that compromises the transistor's ability to resist current flow when it is not active. It will be understood that the short in NMOS transistor 306-2 may be a relatively weak short (such as 100 ohms) or a relatively strong short (such as 2 ohms). In either case, the defect may compromise the proper function of the row driver 102-1 circuit, as illustrated by the difference between the actual analog voltage level 322 presented at node 112 (illustrated by a solid line) and the desired analog voltage level 322 (illustrated as a dashed line for reference).

In this example, as shown, an analog voltage level 322-2C corresponds with the selection of 0b010 ('2') on the input, an analog voltage level 322-3C corresponds with the selection of 0b011 ('3') on the input, an analog voltage level 322-1C corresponds with the selection of 0b001 ('1') on the input, an analog voltage level 322-0C corresponds with the selection of 0b000 ('0') on the input, and the same analog voltage level 322-2C again corresponds with the selection of 0b010 ('2') on the input at the end of the illustrated sequence. When 0b010 ('2') is selected, the short defect on NMOS transistor 306-2 does not create a problem and the solid and dashed lines are shown to be the same. When any other value is selected however, the short defect effectively produces a resistor divider circuit that compromises the row driver voltage level as manifested by the differences between the solid and dashed waveforms in FIG. 3C. This will be understood to represent an undesirable operation of row driver 102-1 for this sequence of inputs, caused by the defect in NMOS transistor 306-2.

FIGS. 3D and 3E provide a similar example, but for a case where the defect is in one of the PMOS transistors 304 instead of one of the NMOS transistors. In the examples of FIGS. 3D and 3E, the sequence goes from 0b000 ('0') to 0b001 ('1') to 0b011 ('3') to 0b010 ('2') back to 0b000 ('0'). Again, the particular transistor 304 or 306 activated by decoder 302 for each of these digital values is shown parenthetically on the waveform in connection with the respective digital values. For example, the 0b000 ('0') digital value causes PMOS transistor 304-0 to be activated, the 0b001 ('1') digital value causes PMOS transistor 304-1 to be activated, and so forth. Again, based on the regulated or ground voltages powering these various transistors (not explicitly shown), an analog voltage level 322 corresponding to that transistor is applied to the row driver voltage at node 112 as illustrated in the waveform below the sequence of level select input 110 values ("Row Driver Voltage at Node 112").

In FIG. 3D, defect indicators 320-D show that both of PMOS transistors 304 and all of NMOS transistors 306 are free of defects and fully functional. Accordingly, the waveforms show that an analog voltage level 322-0D corresponds with the selection of 0b000 ('0') on the input, an analog voltage level 322-1D corresponds with the selection of 0b001 ('1') on the input, an analog voltage level 322-3D corresponds with the selection of 0b011 ('3') on the input, an analog voltage level 322-2D corresponds with the selection of 0b010 ('2') on the input, and the same analog voltage level 322-0D again corresponds with the selection of 0b000 ('0') on the input at the end of the illustrated sequence. This will be understood to represent the desired and defect-free operation of row driver 102-1 for this sequence of inputs.

In contrast, FIG. 3E uses the same input sequence to illustrate the outcome when a defect is present on one of the PMOS transistors 304. Specifically, in FIG. 3E, defect indicators 320-E show that, while PMOS transistor 304-1 and all of NMOS transistors 306 are free of defects and fully functional, PMOS transistor 304-0 includes a defect. More particularly, the defect in PMOS transistor 304-0 will be understood to be a short defect that compromises the transistor's ability to resist current flow when it is not activated. It will be understood that the short in PMOS transistor 304-0 may be a relatively weak short (such as 100 ohms) or a relatively strong short (such as 2 ohms). In either case, the defect may compromise the proper function of the row driver 102-1 circuit, as illustrated by the difference between the actual analog voltage level 322 presented at node 112

(again illustrated by a solid line) and the desired analog voltage level 322 (again illustrated as a dashed line for reference).

In this example, as shown, an analog voltage level 322-0E corresponds with the selection of 0b000 ('0') on the input, an analog voltage level 322-1E corresponds with the selection of 0b001 ('1') on the input, an analog voltage level 322-3E corresponds with the selection of 0b011 ('3') on the input, an analog voltage level 322-2E corresponds with the selection of 0b010 ('2') on the input, and the same analog voltage level 322-0E again corresponds with the selection of 0b000 ('0') on the input at the end of the illustrated sequence. In this example, when 0b000 ('0') is selected, the short defect on PMOS transistor 304-0 does not create a problem and the solid and dashed lines are shown to be the same. When any other value is selected however, the short defect effectively produces a resistor divider circuit that compromises the row driver voltage level as manifested by the differences between the solid and dashed waveforms in FIG. 3E. This will be understood to represent an undesirable operation of row driver 102-1 for this sequence of inputs, caused by the defect in PMOS transistor 304-0.

To detect faults or defects in a row driver such as those defects illustrated in FIGS. 3C and 3E for row driver 102-1, one type of fault detection mechanism that has been used is a sample-and-hold mechanism that pre-charges a node to a known voltage and monitors for a voltage swing on that node. With this conventional, non-level-based type of fault detection, a change or toggle from one reference voltage has been used to indicate that a row driver is functioning properly, while an absence of such a change is interpreted to indicate that a fault is present. This conventional approach may be relatively effective for detecting certain types of faults and defects, such as open defects in which one of the row driver transistors is inhibited in conducting current when activated. Unfortunately, other types of defects such as short defects and gate defects may tend to evade this type of fault detection. For example, the relative strength of a given short (from a strong short defect of only a few ohms to a weak short defect of hundreds of ohms) may determine how severely the analog voltage level of the row driver voltage at node 112 is compromised. In many situations, the effective resistor divider produced by a short defect in a transistor that is not selected may adversely affect the analog voltage level as illustrated by the difference between the solid and dashed lines in FIGS. 3C and 3E. However, if the row driver voltage is still significant enough to activate a transistor in the sample-and-hold fault detection mechanism, this short defect may be masked and not detected in the same way that an open defect would be. In other words, merely checking for an expected voltage swing toggle (in the non-level-based approach), rather than verifying an actual voltage level (in the level-based approach), may not be sufficient for detecting certain faults and defects that could be present in a given row driver circuit.

To illustrate the deficiency of this type of conventional, non-level-based fault detection mechanism, FIG. 3F shows an illustrative table 330 indicating fault detection capabilities of a non-level-based fault detection approach such as described above. In table 330, a left-most column ("Transistor/Defect") indicates a reference number for a row driver transistor that may have a particular type of defect in a certain example. Each of the PMOS transistors 304, the NMOS transistors 306, and the shield transistors 310 is represented in this column (a total of ten transistors). In the other three columns of the table, different types of defects are indicated: 1) to be "Undetected" by the non-level-based fault detection mechanism, 2) to be "Detected" by the non-level-based fault detection mechanism, or 3) to provide a "Safe Fault" (in the case of shield transistors 310). As shown in the first defect column ("Gate Open"), when a gate defect is present on any of PMOS transistors 304 or NMOS transistors 306, the gate defect goes undetected by the non-level-based fault detection mechanism described above. Likewise, as shown in the right most column ("S-D Short"), when a short defect from the source to the drain is present on any of PMOS transistors 304 or NMOS transistors 306, the short defect also goes undetected by this type of fault detection mechanism. As indicated by the middle defect column ("S-D Open"), the only defects detected by non-level-based fault detection mechanisms such as described above may be those open defects from the source to the drain of PMOS transistors 304 and NMOS transistors 306. Additionally, the shield transistors 310 are shown to successfully perform their role to provide safe faults to the other transistors when defects arise.

A summary table 332 below table 330 summarizes the performance of this type of fault detection approach. For the 30 total faults represented in table 330, only 10 of these are positively detected (when source-to-drain open defects are present) and 4 safe faults are provided. The other 16 defects are shown to fall into the undetected faults category, such that the total detection coverage is 46.7% in this example. While such a fault detection approach may be valuable (as it may at least help detect certain faults and defects some of the time), a more reliable and consistent fault detection approach may be desirable, especially for higher stakes optical sensor applications and especially when such an approach can be implemented with minimal or no tradeoffs in terms of area usage, power usage, and so forth. Accordingly, an example of a level-based fault detection system that features these and other advantageous characteristics will now be illustrated and described.

Figure 4A:
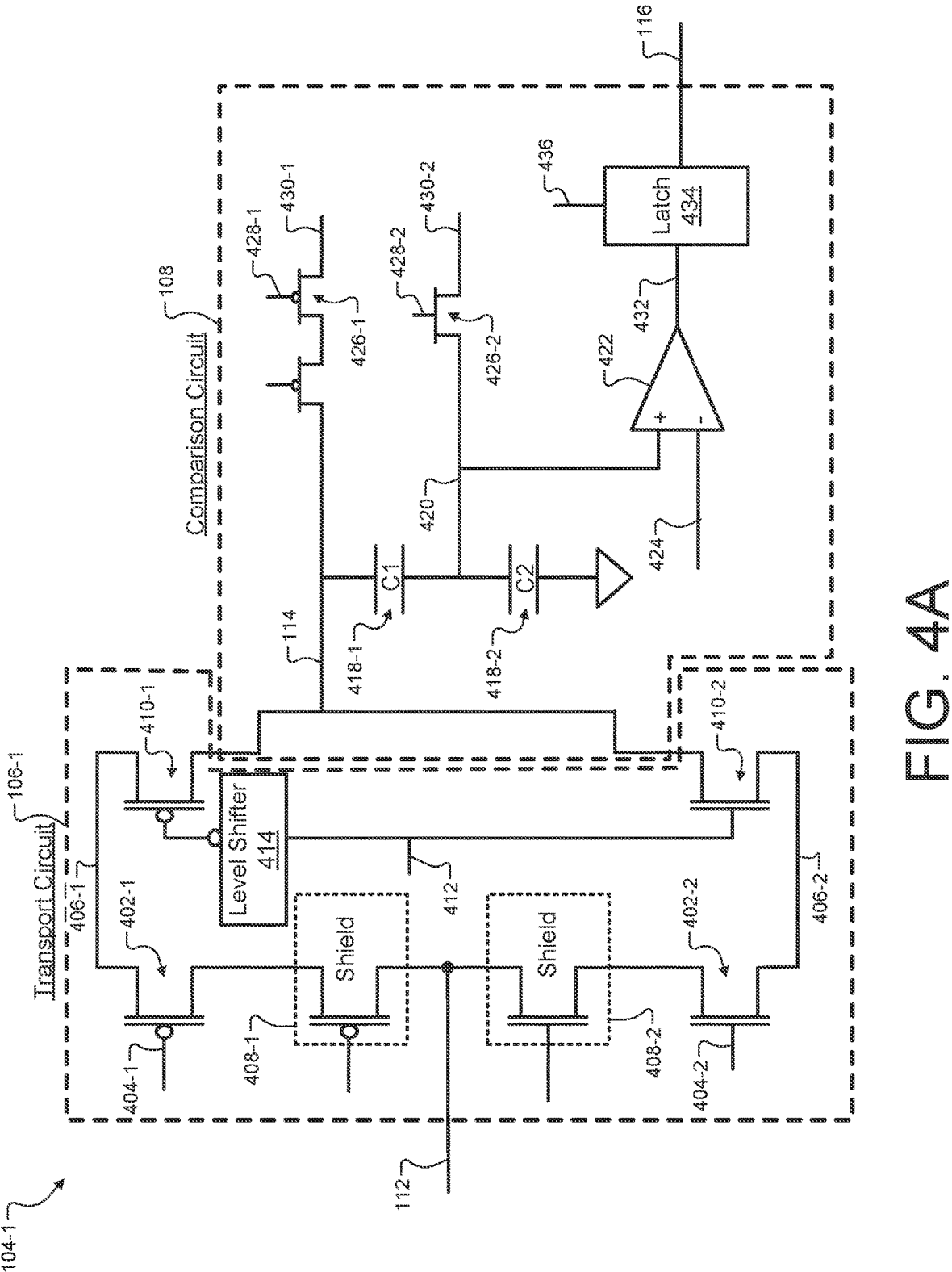
FIG. 4A shows illustrative circuitry for an example level-based fault detection system in accordance with principles described herein.

FIG. 4A shows illustrative circuitry for an example implementation of fault detection system 104-1 in accordance with principles described herein. Fault detection system 104-1 represents a level-based fault detection system configured to improve on disadvantages described above for non-level-based fault detection mechanisms that detect faults based on the toggling (or lack thereof) of voltages rather than based on their voltage levels. As shown, this implementation of fault detection system 104-1 includes a transport circuit 106-1 that is dedicated to a particular row, such as the row served by row driver 102-1, and that receives a row driver voltage on input node 112, which is the output of row driver 102-1 (as described above). As has been described, transport circuit 106-1 is connected, along with various other transport circuits associated with other rows, to the shared comparison circuit 108 at the monitoring node 114. As has been described, comparison circuit 108 produces digital output 116 for use by other systems, circuits, and processes that are beyond the scope of this description. An implementation of each of these elements will now be described in more detail in connection with additional components, nodes, signals, voltages, and so forth, that help these circuits perform the functions that have been described.

Within transport circuit 106-1, a routing transistor 402-1 and a routing transistor 402-2 (collectively referred to as routing transistors 402) are each connected to input node 112 to provide two possible paths for currents on input node 112. As shown, routing transistor 402-1 may be implemented by a PMOS transistor that is controlled by a voltage on a routing control node 404-1 connected to the transistor's gate. Routing transistor 402-2 is then shown to be implemented in this example by an NMOS transistor that is controlled by a voltage on a routing control node 404-2 connected to its gate. As has been described, the analog voltage level of the row driver voltage on node 112 may vary over a relatively wide range, such as a range from −1V to 4V in one implementation. Because this may be wider than the operating range of single PMOS or NMOS transistors within this image sensor IC, both of transistors 402 may be included in transport circuit 106-1 to help condition and route the row driver voltage regardless of its voltage level. For example, when the row is selected for a read operation and it is one of the PMOS transistors 304 of row driver 102-1 that is activated (such that the row driver voltage at node 112 has a relatively high voltage level), a voltage on routing control node 404-1 may be driven to activate routing transistor 402-1 while a voltage on routing control node 404-2 may be driven such that routing transistor 402-2 is not activated. Conversely, when the row is selected for the read operation and it is one of that NMOS transistors 306 of row driver 102-1 that is activated (such that the row driver voltage at node 112 has a relatively low voltage level), the voltage on routing control node 404-1 may be driven to cause routing transistor 402-1 to not be activated while the voltage on routing control node 404-2 activates routing transistor 402-2.

In some implementations, the voltages on routing control nodes 404-1 and 404-2 may be controlled by the same mechanism driving the gates of PMOS transistors 304 and NMOS transistors 306. For example, the voltages may be controlled by decoder 302 and/or other related circuitry. In this case, when either of PMOS transistors 304 is selected, the same signal driving the gate of one of PMOS transistors 304 may also be used at routing control node 404-1 to activate routing transistor 402-1. Similarly, when any one of NMOS transistors 306 is selected, the same signal driving the gate of one of NMOS transistors 306 may also be used at routing control node 404-2 to activate routing transistor 402-2. In other implementations, independent, dedicated signaling may be used to drive routing control nodes 404-1 and 404-2 to control routing transistors 402-1 and 402-2 independently of the row driver.

In this way, when the row is selected, transport circuit 106-1 may be configured to route the row driver voltage to monitoring node 114 by way of components that are configured to support (or to handle without undue stress) whatever the voltage level happens to be, from a relatively high voltage level (such as 4V) when a PMOS transistor 304 is activated within row driver 102-1 to a relatively low voltage level (such as −1V) when it is an NMOS transistors 306 that is activated. More particularly, as shown, transport circuit 106-1 includes the routing transistors 402-1 and 402-2 to collectively route the row driver voltage to monitoring node 114 either: 1) by way of a first path through routing transistor 402-1 when an analog voltage level of the row driver voltage is greater than a threshold level, or 2) by way of a second path through routing transistor 402-2 when the analog voltage level of the row driver voltage is less than the threshold level. For example, the threshold level may be set between the voltage levels associated with the PMOS transistors 304 and the NMOS transistors 306 or at another suitable level based on the operating ranges of routing transistors 402. A routing node 406-1 is shown to be part of the first path through routing transistor 402-1 in FIG. 4A, while a routing node 406-2 is shown to be part of the second path through routing transistor 402-2.

Also shown in transport circuit 106-1 in this example are respective shield transistors placed both on the first path through routing transistor 402-1 and routing node 406-1 and on the second path through routing transistor 402-2 and routing node 406-2. More particularly, as shown, a first shield transistor 408-1 may be configured to protect routing transistor 402-1 from voltage levels outside a first operating range of routing transistor 402-1, while a second shield transistor 408-2 may be configured to protect routing transistor 402-2 from voltage levels outside a second operating range of routing transistor 402-2. For example, shield transistor 408-1 is shown to be implemented as a PMOS transistor to protect routing transistor 402-1 from voltages outside a PMOS operating range and shield transistor 408-2 is shown to be implemented as an NMOS transistor to protect routing transistor 402-2 from voltages outside an NMOS operating range. As with routing transistors 402, the two shield transistors 408 may help ensure that only one of the first path or the second path are used and current steered in a manner that respects the capabilities and operating ranges of the components that handle the current.

Upon being properly routed through one of routing transistors 402-1 or 402-2 onto one of routing nodes 406-1 or 406-2, respective monitor selection transistors 410-1 and 410-2 (collectively referred to as monitor selection transistors 410) are also shown to be included within transport circuit 106-1 to regulate which routing node 406-1 or 406-2 is electrically connected to the shared monitoring node 114 and when (and under what circumstances) this connection is made. In like manner as described above with routing transistors 402, transport circuit 106-1 is shown to include: 1) a first monitor selection transistor 410-1 that, when activated, connects monitoring node 114 to the first path by way of which the row driver voltage is routed when an analog voltage level of the row driver voltage is greater than a threshold level (that is, the path through routing transistor 402-1 and routing node 406-1); and 2) a second monitor selection transistor 410-2 that, when activated, connects monitoring node 114 to the second path by way of which the row driver voltage is routed when an analog voltage level of the row driver voltage is less than the threshold level (that is, the path through routing transistor 402-2 and routing node 406-2). As shown, and for the same reasons as described above for routing transistors 402-1 and 402-2, monitor selection transistor 410-1 may be implemented as a PMOS transistor and monitor selection transistor 410-2 may be implemented as an NMOS transistor.

Also shown in transport circuit 106-1 is a control node 412 on which a control signal may be received and used to control activation of both monitor selection transistors 410. Whereas separate control signals having appropriate voltage ranges were described as being used at routing control nodes 404-1 and 404-2 to control the different PMOS and NMOS routing transistors 402, this implementation shows a common control node 412 being used to control both monitor selection transistors 410. Accordingly, a level shifter 414 is shown to convert the signal on control node 412 to an appropriate voltage level for monitor selection transistor 410-1 before being presented at the gate of monitor selection transistor 410-1 (it is assumed for this example that the voltage level of the control signal on control node 412 is suitable for driving the gate of monitor selection transistor 410-2 without such level shifting). In other implementations, switching of monitor selection transistors 410 could be performed for multiple rows or globally. As such, instead of having a dedicated level shifter for each row (such as illustrated by level shifter 414), a smaller number of group level shifters that each serve a plurality of rows or a single global level shifter that serves all of the rows could be employed in certain implementations.

Similarly, while this implementation of transport circuit 106-1 includes dedicated monitor selection transistors 410 associated only with one row, it will be understood that, in other implementations, monitor selection transistors could be combined across multiple rows as may be convenient for the layout of the IC. For example, the routing nodes could be routed independently and combined in a common area, such that a single pair of monitor selection transistors could be used to serve all of the rows in a particular implementation (rather than each row having its own dedicated monitor selection transistors as illustrated in the example of transport circuit 106-1).

Whether dedicated or shared between rows, monitor selection transistors such as monitor selection transistors 410 may perform several functions for fault detection system 104-1. A first function to be performed by monitor selection transistors 410 is to act as shield transistors to protect routing transistors 402 during a protection period when a different row is selected to drive a voltage onto the shared monitoring node 114 (that is, when the row associated with transport circuit 106-1 is not selected). More particularly, the control signal on control node 412 may be configured to control activation of monitor selection transistors 410-1 and 410-2 in accordance with a protection period when a different row driver other than the row driver is selected from the plurality of row drivers.

Another function to be performed by monitor selection transistors 410 is to serve as a sample-and-hold switch during a period when the row is selected (that is, when the row is in a readout mode and/or otherwise selected as the row driving a voltage onto the shared monitoring node 114). As will be described in more detail below, monitor selection transistors 410 may be controlled to serve as switches to pass the row driver voltage to monitoring node 114 in a manner that allows the voltage to be properly scaled, level-shifted, and/or otherwise conditioned for comparison with reference voltages in the level-based fault detection technique performed by comparison circuit 108. In particular, the control signal on control node 412 may be configured to control activation of monitor selection transistor 410-1 and monitor selection transistor 410-2 in accordance with a pre-charge phase and an evaluation phase of the period when the row driver is selected from the plurality of row drivers, as will now be described in relation to comparison circuit 108 in FIG. 4A and the timing diagram in FIG. 4B.

As shown in FIG. 4A (and as described and illustrated above in relation to FIG. 1), the shared monitoring node 114 may serve as an output node for each of the plurality of transports circuits 106 (including transport circuit 106-1) and as an input node for comparison circuit 108. To perform the functions of conditioning a voltage from monitoring node 114, performing a comparison between the conditioned voltage and a reference voltage, and latching the digital output based on the comparison, as described above, FIG. 4A shows a variety of elements that may be included in comparison circuit 108. Specifically, as shown, comparison circuit 108 may include: a first capacitor 418-1 with capacitance C1 electrically connected to monitoring node 114; a second capacitor 418-2 with capacitance C2 electrically connected between capacitor 418-1 and ground; a conditioned monitoring node 420 between capacitor 418-1 and capacitor 418-2; a comparator device 422 configured to perform the comparison by being connected to conditioned monitoring node 420 and a reference node 424 for the reference voltage; a first reference control transistor 426-1 that, when activated by a voltage at a reference control node 428-1, connects a first scaling reference node 430-1 to monitoring node 114; and a second reference control transistor 426-2 that, when activated by a voltage at a reference control node 428-2, connects a second scaling reference node 430-2 to conditioned monitoring node 420, as shown.

These elements of comparison circuit 108 may be used to condition the voltage on monitoring node 114 to prepare the voltage for a level-based comparison to be represented by digital output 116. To this end, capacitors 418-1 and 418-2 (collectively referred to as capacitors 418) are shown to form a scaling circuit that is used to convert the voltage at monitoring node 114 to a conditioned voltage at conditioned monitoring node 420. Comparator device 422 is then configured to compare this voltage on conditioned monitoring node 420 to a reference voltage on reference node 424, which may be selected based on the test being performed. For example, when a test is being performed for the PMOS transistors 304 of the row driver 102-1 the reference voltage on reference node 424 may be one level (set by one LDO regulator, for example), whereas when a test is being performed for the NMOS transistors 306 of the row driver 102-1 the reference voltage on reference node 424 may be a different level (set by a different LDO regulator, for example). These tests will now be described in more detail.

During a period when a particular row is selected, comparison circuit 108 may be configured to perform two level-based fault detection tests for the row driver of that particular row. A first level-based fault detection test is performed to determine whether a fault or defect is present in any of the PMOS transistors 304 of the row driver and a second level-based fault detection test is performed to determine whether a fault or defect is present in any of the NMOS transistors 306 of the row driver. For both of these tests, the scaling circuit formed by capacitors 418 helps to level shift the voltage level at monitoring node 114 to comport with the operating parameters of comparator device 422, as well as to scale the voltage level in preparation for being compared to the proper reference voltage (which is different for each of the tests, as mentioned above). The voltage conditioning performed by this scaling circuit may be performed differently for these two tests, as will now be described. However, as mentioned above and as illustrated in more detail below in relation to FIG. 4B, the voltage conditioning in each case may be performed in the same two phases: a pre-charge phase and an evaluation phase.

During the pre-charge phase for a test of the NMOS transistors 306, the scaling reference voltage on scaling reference node 430-1 is sampled onto monitoring node 114. Then, during the evaluation phase for this test, the row driver voltage on routing node 406-1 or routing node 406-2 is sampled onto monitoring node 114. This is done by the voltage at reference control node 428-2 causing the scaling reference voltage on second scaling reference node 430-2 to be disconnected from conditioned monitoring node 420 so that a difference of the row driver voltage and the first scaling reference voltage (at node 430-1) will be driven on conditioned monitoring node 420. Specifically, if the scaling reference voltage at scaling reference node 430-1 is referred to as Vref1, the scaling reference voltage at scaling reference node 430-2 is referred to as Vref2, the row driver voltage being routed through transport circuit 106-1 is referred to as Vhi1, and the respective capacitances of capacitors 418 are C1 and C2 (as labeled), the voltage at conditioned monitoring node 420 for this test, Vcomp_Vhi, may be computed according to Equation 1:

$$\text{Vcomp\_Vhi} = Vref2 + (Vhi1 - Vref1) * \cfrac{1}{1 + \cfrac{C2}{C1}} \qquad \text{(Eq. 1)}$$

In contrast, during the pre-charge phase for a test of the PMOS transistors 304, the row driver voltage on routing node 406-1 or routing node 406-2 may be sampled onto monitoring node 114 by activating monitor selection transistors 410 using the control voltage on control node 412. Then, during the evaluation phase for this test, the scaling reference voltage on scaling reference node 430-1 may be sampled onto monitoring node 114. This is done by the control voltage at control node 412 causing the row driver voltage to be disconnected from conditioned monitoring node 420 so that a difference of the scaling reference voltage on scaling reference node 430-1 and the row driver voltage will be driven on conditioned monitoring node 420. Specifically, referring again to the voltages by the labels set forth above, and referring to the row driver voltage being routed through transport circuit 106-1 for this test as Vlo1, the voltage for this test at conditioned monitoring node 420, Vcomp_Vlo, may be computed according to Equation 2:

$$\text{Vcomp\_Vlo} = Vref2 + (Vref1 - Vlo1) * \cfrac{1}{1 + \cfrac{C2}{C1}} \qquad \text{(Eq. 2)}$$

With the conditioned voltage on the conditioned monitoring node 420 for a given test (and once the voltage has had time to settle and so forth), comparator device 422 may be used to compare this voltage with an appropriate reference voltage driven onto reference node 424 in accordance with which test is ongoing. For example, as shown in FIG. 4A, comparison circuit 108 may include a storage circuit connected to a comparator output 432 of comparator device 422. In this example, the storage circuit is implemented as a latch 434 that is configured to perform the latching of digital output 116 based on an enable signal 436. In this way, the storage circuit (latch 434) may store and output digital output 116.

As described above, separate tests may be performed at separate times to check both the NMOS and the PMOS transistors of each row driver. Accordingly, in certain examples, digital output 116 may represent a 2-bit digital output that indicates the outcomes for both of these tests. For example, digital output 116 may include a first output bit determined at a first time when the reference voltage at reference node 424 has a first reference level (for testing the NMOS transistors 306) and a second output bit determined at a second time when the reference voltage at reference node 424 has a second reference level (for testing the PMOS transistors 304). The first output bit may indicate whether a defect is detected in any of NMOS transistors 306, while the second output bit may indicate whether a defect is detected in any of the PMOS transistors 304. Comparison circuit 108 may thus include a storage circuit (latch 434) capable of storing and outputting both of these output bits for digital output 116.

For the configuration shown in FIG. 4A, the comparator output 432 of comparator device 422 may be high (a logical '1') during the first test represented by Equation 1 (where the row driver voltage is represented by Vhi1) if all of the NMOS transistors 306 are free of defects and faults. Conversely, comparator output 432 may be low (a logical '0')

for this first test if at least one of NMOS transistors 306 has a defect. For the second test represented by Equation 2 (where the row driver voltage is represented by Vlo1), the comparator output 432 of comparator device 422 may be high if all of the PMOS transistors 304 are free of defects and faults, whereas the comparator output 432 may be low for this test if at least one of PMOS transistors 304 has a defect. Enable signal 436 may be configured to latch the storage circuit (latch 434) to store these values for the different tests at an appropriate time after the switching is complete, voltages have settled, and so forth.

Figure 4B:
FIG. 4B shows an illustrative time diagram for an example level-based fault detection system in accordance with principles described herein.

To illustrate the timing of this process for two example tests being performed for the row served by row driver 102-1, FIG. 4B shows an illustrative timing diagram 440 for various signals that have been illustrated and described in relation to fault detection system 104-1. In this example, it will be assumed that signaling at routing control nodes 404-1 and 404-2 is controlled by the same decoder signals being used to control PMOS transistors 304 and NMOS transistors 306, though it will be understood (as mentioned above) that with certain modifications signaling could also be performed independently (with dedicated control signals).

In FIG. 4B, timing diagram 440 depicts characteristics of a variety of nodes and voltages that have been described for two example tests 442. In a first test 442-1, the NMOS transistors 306 are checked in accordance with Equation 1 by ensuring that a voltage level is correct when a PMOS transistor (specifically, PMOS transistor 304-0 in this example) of row driver 102-1 is selected to drive node 112 at an analog voltage level 322-0 (Vhi1 in Equation 1). In a second test 442-2, the PMOS transistors 304 are checked in accordance with Equation 2 by ensuring that a voltage level is correct when an NMOS transistor (specifically, NMOS transistor 306-2 in this example) of row driver 102-1 is selected to drive node 112 at an analog voltage level 322-2 (Vlo1 in Equation 2). As shown, the various control signals on the various nodes controlling transistors within fault detection system 104-1 may be driven to different levels so as to implement the pre-charge and evaluation phases as they have been described, and then to latch the test outcomes at the proper times (when enable signal 436 briefly goes to '1' near the end of each test 442).

Having illustrated and described the level-based fault detection performed by fault detection system 104-1 in FIGS. 4A and 4B, it is clear how this new approach improves on the conventional fault detection mechanisms described above (as represented by table 330 in FIG. 3F). To further illustrate these improvements, table 330 may be contrasted with an illustrative table 450 in FIG. 4C. Table 450 indicates fault detection capabilities of level-based fault detection systems such as fault detection system 104-1 described in relation to FIGS. 4A and 4B.

Similar to table 330 described above, table 450 includes a left-most column ("Transistor/Defect") that indicates reference numbers for row driver transistors that are tested against particular types of defects. Each of the PMOS transistors 304, the NMOS transistors 306, and the shield transistors 310 is represented in this column (a total of ten transistors), followed by the different types of possible defects in the other three columns of the table, as described above. In contrast to table 330, table 450 shows that a level-based fault detection system such as fault detection system 104-1 may detect not only the open defects (as represented in the "S-D Open" column) but also all of the gate defects (as represented in the "Gate Open" column) and all of the short defects (as represented in the "S-D Short"

column). The shield transistors 310 are again shown to successfully perform their role to provide safe faults to the other row driver transistors when defects arise.

A summary table 452 below table 450 summarizes the performance of a level-based fault detection system such as described herein. For the 30 total faults represented in table 452, 26 are positively detected, along with the 4 safe faults that are successfully provided. There are no undetected faults in this case, such that the total detection coverage is 100% in this example. Accordingly, this level-based fault detection approach provides a significant improvement in reliability and consistency for various optical sensor applications, including high stakes applications that require such test coverage. At the same time, this approach does not require significant tradeoffs in terms of area usage, power usage, or the like, making it highly advantageous for use in many image sensor IC designs.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite illustrative relationships described in the specification or shown in the figures.

The various apparatus and techniques described herein may be implemented using various semiconductor processing and/or packaging techniques. Some embodiments may be implemented using various types of semiconductor processing technologies associated with semiconductor substrates including, but not limited to, for example, Silicon (Si), Gallium Arsenide (GaAs), Silicon Carbide (SiC), and/ or so forth.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present.

Although the terms directly on, directly connected to, or directly coupled to may not be used throughout the detailed description, elements that are shown as being directly on, directly connected or directly coupled can be referred to as such. The claims of the application may be amended to recite illustrative relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A fault detection system comprising:
an input node electrically connected to a row driver that produces, on the input node, a row driver voltage having one of a plurality of analog voltage levels;
a transport circuit configured to transport, when the row driver is selected from a plurality of row drivers, the row driver voltage to a monitoring node shared by a plurality of fault detection systems including the fault detection system; and a comparison circuit shared by the plurality of fault detection systems and configured to generate a digital output based on the row driver voltage and a reference voltage.

2. The fault detection system of claim 1, wherein the row driver is configured to activate a plurality of transistors one at a time so that the row driver voltage is driven at:

a first voltage level of the plurality of analog voltage levels when a first PMOS transistor of the plurality of transistors is activated;

a second voltage level of the plurality of analog voltage levels when a second PMOS transistor of the plurality of transistors is activated;

a third voltage level of the plurality of analog voltage levels when a first NMOS transistor of the plurality of transistors is activated; and a fourth voltage level of the plurality of analog voltage levels when a second NMOS transistor of the plurality of transistors is activated.

3. The fault detection system of claim 2, wherein the digital output includes:

a first output bit determined at a first time when the reference voltage has a first reference level, the first output bit indicating whether a defect is detected in the first NMOS transistor or the second NMOS transistor; and a second output bit determined at a second time when the reference voltage has a second reference level, the second output bit indicating whether a defect is detected in the first PMOS transistor or the second PMOS transistor.

4. The fault detection system of claim 3, wherein the comparison circuit includes a storage circuit configured to store and output the first output bit and the second output bit of the digital output.

5. The fault detection system of claim 1, wherein the transport circuit includes a first routing transistor and a second routing transistor collectively configured to route the row driver voltage to the monitoring node either:

by way of a first path through the first routing transistor when an analog voltage level of the row driver voltage is greater than a threshold level, or by way of a second path through the second routing transistor when the analog voltage level of the row driver voltage is less than the threshold level.

6. The fault detection system of claim 5, wherein the transport circuit further includes:

a first shield transistor configured to protect the first routing transistor from voltage levels outside a first operating range of the first routing transistor; and a second shield transistor configured to protect the second routing transistor from voltage levels outside a second operating range of the second routing transistor.

7. The fault detection system of claim 1, wherein the transport circuit includes:

a first monitor selection transistor that, when activated, connects the monitoring node to a first path by way of which the row driver voltage is routed when an analog voltage level of the row driver voltage is greater than a threshold level;

a second monitor selection transistor that, when activated, connects the monitoring node to a second path by way of which the row driver voltage is routed when the analog voltage level of the row driver voltage is less than the threshold level; and a control node on which a control signal is received, the control signal being configured to control activation of the first monitor selection transistor and the second monitor selection transistor.

8. The fault detection system of claim 7, wherein the control signal is configured to control activation of the first monitor selection transistor and the second monitor selection transistor in accordance with a pre-charge phase and an evaluation phase of a period when the row driver is selected from the plurality of row drivers.

9. The fault detection system of claim 7, wherein the control signal is configured to control activation of the first monitor selection transistor and the second monitor selection transistor in accordance with a protection period when a different row driver other than the row driver is selected from the plurality of row drivers.

10. The fault detection system of claim 1, wherein the comparison circuit includes:

a first capacitor electrically connected to the monitoring node;

a second capacitor electrically connected between the first capacitor and ground;

a conditioned monitoring node between the first capacitor and the second capacitor;

a comparator device connected to the conditioned monitoring node and a reference node for the reference voltage;

a first reference control transistor that, when activated, connects a first scaling reference node to the monitoring node; and a second reference control transistor that, when activated, connects a second scaling reference node to the conditioned monitoring node.

11. The fault detection system of claim 10, wherein the comparison circuit further includes a storage circuit connected to an output of the comparator device and configured to:

latch the digital output based on an enable signal; and store and output the digital output.

12. An optical sensor integrated circuit comprising:

a plurality of row drivers including a row driver configured to produce a row driver voltage; and a plurality of fault detection systems for the plurality of row drivers, the plurality of fault detection systems including a fault detection system for the row driver, the fault detection system including:

an input node electrically connected to the row driver to receive the row driver voltage, a monitoring node shared by the plurality of fault detection systems, a transport circuit configured to receive the row driver voltage from the input node and transport the row driver voltage to the monitoring node when the row driver is selected from the plurality of row drivers, and a comparison circuit shared by the plurality of fault detection systems, the comparison circuit being configured to receive the row driver voltage via the monitoring node and to generate a digital output based on the row driver voltage and a reference voltage.

13. The optical sensor integrated circuit of claim 12, wherein the row driver is configured to activate a plurality of transistors one at a time so that the row driver voltage is driven at:

a first voltage level when a first PMOS transistor of the plurality of transistors is activated;

a second voltage level when a second PMOS transistor of the plurality of transistors is activated;

a third voltage level when a first NMOS transistor of the plurality of transistors is activated; and a fourth voltage level when a second NMOS transistor of the plurality of transistors is activated;

wherein the first PMOS transistor, the second PMOS transistor, the first NMOS transistor, and the second NMOS transistor are all different transistors of the plurality of transistors.

14. The optical sensor integrated circuit of claim 13, wherein the digital output includes:

a first output bit determined at a first time when the reference voltage has a first reference level, the first output bit indicating whether a defect is detected in the first NMOS transistor or the second NMOS transistor; and a second output bit determined at a second time when the reference voltage has a second reference level, the second output bit indicating whether a defect is detected in the first PMOS transistor or the second PMOS transistor.

15. The optical sensor integrated circuit of claim 12, wherein the transport circuit includes a first routing transistor and a second routing transistor collectively configured to route the row driver voltage to the monitoring node either:

by way of a first path through the first routing transistor when an analog voltage level of the row driver voltage is greater than a threshold level, or by way of a second path through the second routing transistor when the analog voltage level of the row driver voltage is less than the threshold level.

16. The optical sensor integrated circuit of claim 12, wherein the transport circuit includes:

a first monitor selection transistor that, when activated, connects the monitoring node to a first path by way of which the row driver voltage is routed when an analog voltage level of the row driver voltage is greater than a threshold level;

a second monitor selection transistor that, when activated, connects the monitoring node to a second path by way of which the row driver voltage is routed when the analog voltage level of the row driver voltage is less than the threshold level; and a control node on which a control signal is received, the control signal configured to control activation of the first monitor selection transistor and the second monitor selection transistor.

17. A method comprising:

receiving, at an input node of a fault detection system that is electrically connected to a row driver of a plurality of row drivers, a row driver voltage;

transporting, by a transport circuit within the fault detection system and based on a selection of the row driver from the plurality of row drivers, the row driver voltage to a monitoring node shared by a plurality of fault detection systems including the fault detection system; and generating, by a comparison circuit shared by the plurality of fault detection systems, a digital output by conditioning a voltage from the monitoring node, performing a comparison between the conditioned voltage and a reference voltage, and latching the digital output based on the comparison.

18. The method of claim 17, wherein:

the row driver is configured to activate a plurality of transistors of the row driver one at a time so that the row driver voltage is driven at:

a first voltage level when a first PMOS transistor of the plurality of transistors is activated, a second voltage level when a second PMOS transistor of the plurality of transistors is activated, a third voltage level when a first NMOS transistor of the plurality of transistors is activated, and a fourth voltage level when a second NMOS transistor of the plurality of transistors is activated;

wherein the first PMOS transistor, the second PMOS transistor, the first NMOS transistor, and the second NMOS transistor are all different transistors of the plurality of transistors.

19. The method of claim 18, wherein the generating the digital output includes:

determining, at a first time when the reference voltage has a first reference level, a first output bit of the digital output, the first output bit indicating whether a defect is detected in the first NMOS transistor or the second NMOS transistor; and determining, at a second time when the reference voltage has a second reference level, a second output bit of the digital output, the second output bit indicating whether a defect is detected in the first PMOS transistor or the second PMOS transistor.

20. The method of claim 17, wherein the transporting the row driver voltage to the monitoring node includes:

routing the row driver voltage either:

by way of a first path through a first routing transistor within the transport circuit when an analog voltage level of the row driver voltage is greater than a threshold level, or by way of a second path through a second routing transistor within the transport circuit when the analog voltage level of the row driver voltage is less than the threshold level;

connecting, by a first monitor selection transistor when the first monitor selection transistor is activated, the monitoring node to the first path;

connecting, by a second monitor selection transistor when the first monitor selection transistor is activated, the monitoring node to the second path; and controlling, by a control signal received on a control node, activation of the first monitor selection transistor and the second monitor selection transistor.

* * * * *